(12) United States Patent
Conner, II

(10) Patent No.: US 11,852,295 B2
(45) Date of Patent: Dec. 26, 2023

(54) HINGE LUBRICATION DEVICE

(71) Applicant: Hey 9, Inc., Kirtland, OH (US)

(72) Inventor: Larry W. Conner, II, Kirtland, OH (US)

(73) Assignee: Hey 9, Inc., Kirtland, OH (US)

( * ) Notice: Subject to any disclaimer, the term of this patent is extended or adjusted under 35 U.S.C. 154(b) by 109 days.

(21) Appl. No.: 17/192,013

(22) Filed: Mar. 4, 2021

(65) Prior Publication Data

US 2021/0278041 A1 Sep. 9, 2021

Related U.S. Application Data

(60) Provisional application No. 62/985,001, filed on Mar. 4, 2020.

(51) Int. Cl.
*F16N 3/00* (2006.01)
*F16N 31/02* (2006.01)
*E05D 11/02* (2006.01)

(52) U.S. Cl.
CPC ............... *F16N 3/00* (2013.01); *E05D 11/02* (2013.01); *F16N 31/02* (2013.01); *F16N 2210/00* (2013.01)

(58) Field of Classification Search
CPC ... F16N 3/00; F16N 3/06; F16N 19/00; F16N 31/02; E05D 11/02
See application file for complete search history.

(56) References Cited

U.S. PATENT DOCUMENTS

| | | | |
|---|---|---|---|
| 1,918,513 A * | 7/1933 | Atwood | E05D 11/02 16/274 |
| 2,255,529 A * | 9/1941 | May | E05D 11/04 16/274 |
| 3,422,486 A | 1/1969 | Thomas, Jr. | |
| 4,570,291 A | 2/1986 | Smith et al. | |
| 4,749,059 A * | 6/1988 | Jonnes | F16N 7/12 118/DIG. 18 |
| 4,802,259 A | 2/1989 | Geslewitz | |
| 5,198,031 A | 3/1993 | Derstine | |
| 5,224,240 A | 7/1993 | Smith et al. | |
| 6,735,821 B1 | 5/2004 | Christman, Jr. | |
| 7,703,577 B1 | 4/2010 | Zach et al. | |
| 10,603,682 B1 | 3/2020 | Zalucki | |
| 11,220,851 B2 * | 1/2022 | Conner, II | E05D 11/02 |
| 2015/0285435 A1 | 10/2015 | Alghamdi | |
| 2019/0003226 A1 | 1/2019 | Alghamdi | |
| 2020/0078810 A1 | 3/2020 | Zalucki | |

* cited by examiner

*Primary Examiner* — Minh Truong
(74) *Attorney, Agent, or Firm* — Calfee, Halter & Griswold LLP

(57) ABSTRACT

A device for lubricating a hinge includes a housing, a first elongated opening, and an absorption element. The first elongated opening allows the housing to be placed over at least a portion of a hinge. The first absorption element entirely disposed within the housing such that the first absorption element is positioned to engage a portion of a hinge when the housing is placed over the portion of the hinge.

15 Claims, 24 Drawing Sheets

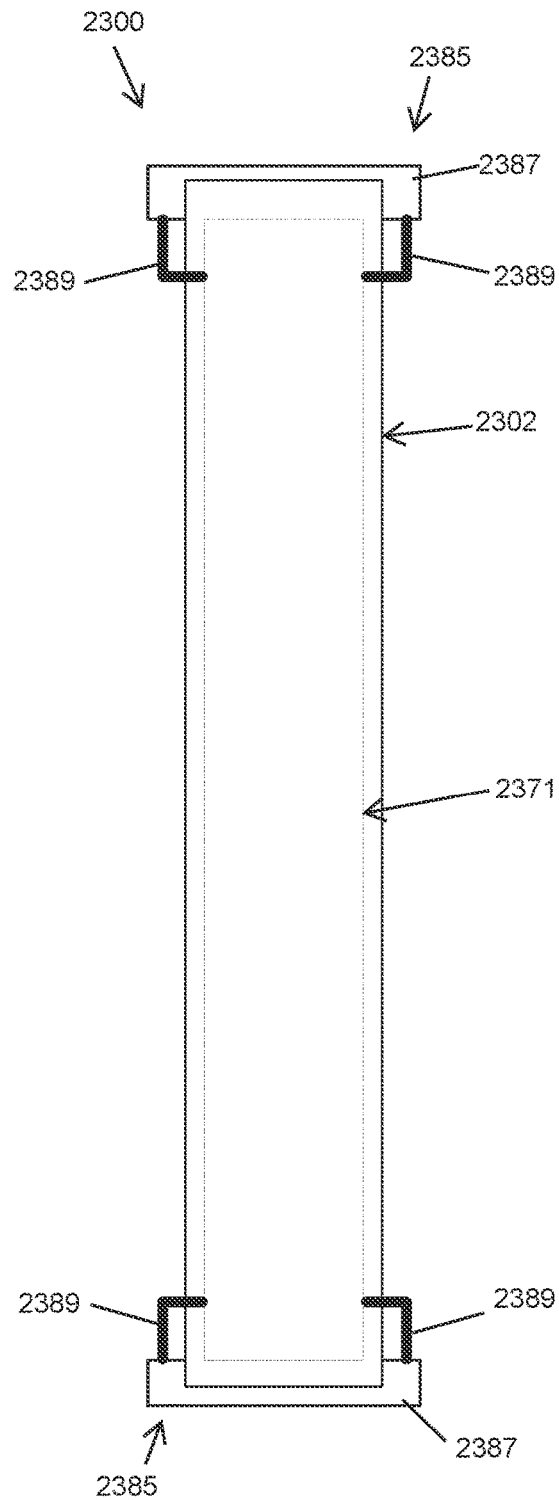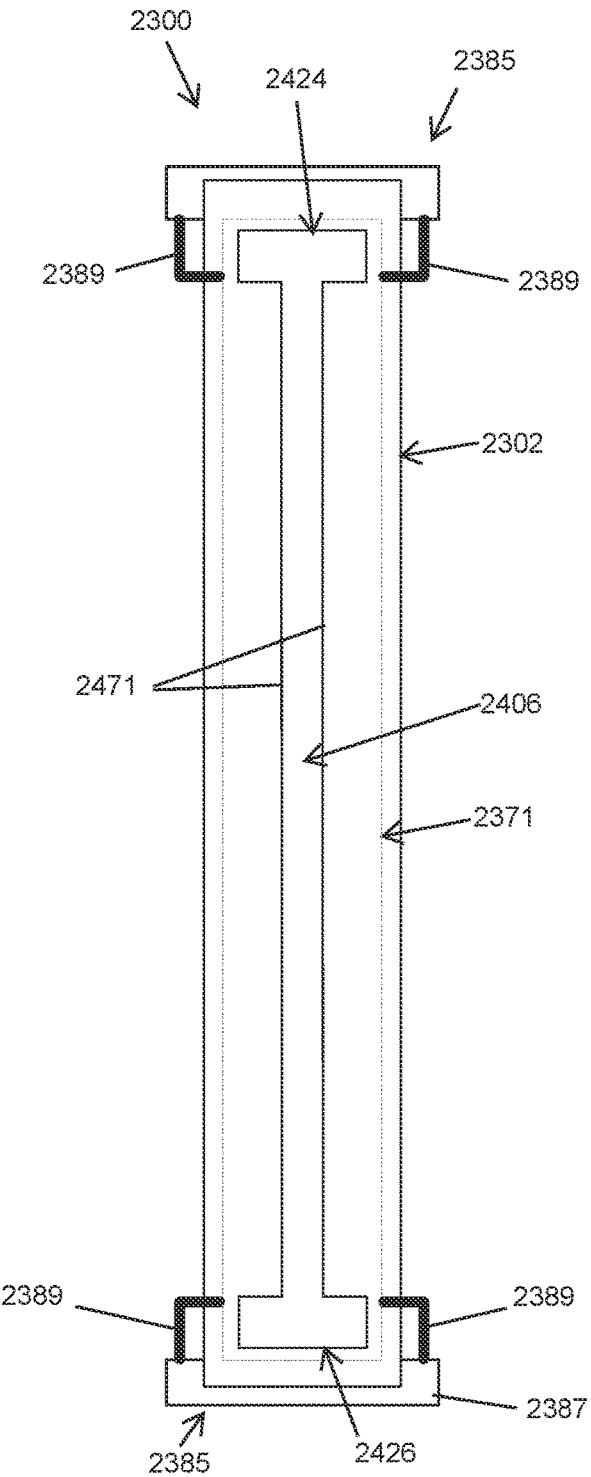

HINGE LUBRICATION DEVICE

TECHNICAL FIELD

The present invention relates generally to devices for lubricating a hinge, such as a hinge for a door.

BACKGROUND

Typical hinges for a door include a first side plate that is fixed to a door (e.g., by one or more fasteners), a second side plate that is fixed to a wall that is adjacent to the door (e.g., by one or more fasteners, and a pin. The first side plate has one or more knuckles for connecting the first side plate to the pin such that the first side plate can pivot about the pin, and the second side plate has one or more knuckles for connecting the second side plate. The one or more knuckles are hollow tubes that fit over a shaft of the pin, and the pin has a top tip and a bottom tip fork keeping the knuckles on the shaft of the pin.

As a door is moved between the open and closed positions, the knuckles of the side plates engage with each other and with the pin, which creates a frictional force between the components. If this frictional force becomes too high, the engagement between the knuckles and the pin causes a squeaking noise when the door is moved between the open and closed positions. In addition, the friction between the components often results in small-particle swarf or grim accumulating on the hinge assembly.

This squeaking noise can be prevented by lubricating the door hinge with a lubricant (e.g., WD-40®, PB B'laster®, silicone spray, silicone grease, etc.) that reduces the friction between the various components of the hinge. Lubricant can be applied to a hinge by disassembling the hinge and applying lubricant to the component parts prior to reassembly, spraying the lubricant on the hinge without first taking it apart and then wiping the excess lubricant with a towel, or applying the lubricant to an applicator (e.g., a fabric material, towel, a brush, a sponge, etc.) and wiping the hinge with the applicator. Lubricant can also be applied to a device that is subsequently attached to a hinge, and the lubricant moves from the device to the hinge by a capillary action.

SUMMARY

An exemplary embodiment of a device for lubricating a hinge includes a flexible housing and a first absorption element. The flexible housing has a hinge opening that is configured to receive a hinge such that the hinge is disposed within the housing. The first absorption element is disposed within the flexible housing such that a compression force to the flexible housing causes the first absorption element to compress. When the first absorption element is absorbing lubricant and a hinge is disposed within the flexible housing, the first absorption element is positioned to engage the hinge such that the lubricant is dispensed from the first absorption element and onto the hinge when the first absorption element is compressed.

Another exemplary embodiment of a device for lubricating a hinge includes a housing, a first elongated opening, and an absorption element. The first elongated opening allows the housing to be placed over at least a portion of a hinge. The first absorption element entirely disposed within the housing such that the first absorption element is positioned to engage a portion of a hinge when the housing is placed over the portion of the hinge.

An exemplary method of lubricating a hinge includes placing a lubrication device over the hinge. The lubrication device has a housing and an absorption element disposed within the housing. The lubrication device is placed over the hinge by moving the hinge through a hinge opening of the housing such that the hinge is disposed within the housing. The absorption element of the lubrication device is positioned to engage the hinge when the hinge is disposed within the housing. The method further includes applying a compression force to the absorption element to cause lubricant being absorbed by the absorption element to be dispensed onto the hinge.

BRIEF DESCRIPTION OF THE DRAWINGS

FIG. 23 is a front schematic view of another exemplary embodiment of a hinge lubrication device;

FIG. 24 is a rear schematic view of the hinge lubrication device of FIG. 23;

DETAILED DESCRIPTION

Figure 1:
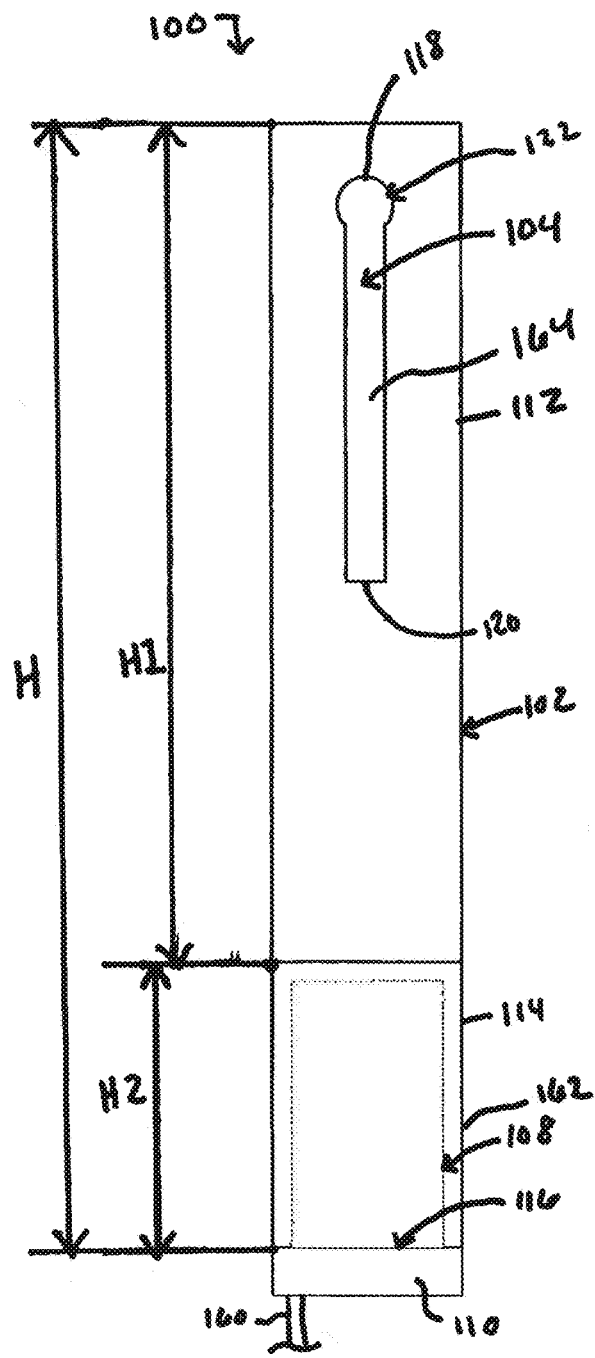
FIG. 1 is a front schematic view of an exemplary embodiment of a hinge lubrication device.

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

Hinges are often lubricated by applying a lubricant to the hinge by a spray device, or by applying the lubricant to an applicator (e.g., a fabric material, a towel, a brush, a sponge, etc.) and wiping the hinge down with the applicator. If a user is applying a spray lubricant directly to the hinge, a sufficient amount of lubricant needs to be sprayed onto the hinge in order for the lubricant to properly lubricate the hinge's inner portions, which can lead to lubricant being applied to a wall or door that is adjacent to the hinge, or can lead to the lubricant falling onto the floor. Lubricant being applied to the adjacent wall or door is problematic because the lubricant can lead to difficulties with paint adhesion in the future, and lubricant falling onto the floor is problematic because the lubricant can cause a slipping hazard. In addition, the resultant overspray on the wall, door, and/or floor necessitates a time-consuming and frustrating clean-up process. The pressurized spray can also cause any swarf (e.g., grindings from the hinge, dirt, or a combination thereof) that has accumulated on the hinge to be sprayed onto the wall or floor, which can cause staining or streaking that is difficult to clean. Alternatively, the hinge can be taken apart, and the lubricant can be sprayed directly onto the inner portions of the hinge, which can be time consuming. If a user is applying lubricant to a fabric material and wiping the lubricant directly to the hinge, the hinge needs to be taken apart in order for the user to apply the lubricant to the inner portions of the hinge, which is also time consuming. In addition, the hinge needs to be reassembled after the act of lubricating, thus adding even more time to the act of lubricating the hinge. If the inner portions of the hinge are not properly lubricated, the door may continue to squeak, or squeaking may return within a short period of time.

The exemplary hinge lubrication devices described herein are configured to be placed over a hinge, such that a lubricant (e.g., WD-40®, PB B'laster®, silicone spray, etc.) can be applied to the hinge without the lubricant falling onto the floor or being sprayed onto a wall or door that abuts the hinge, without hinge swarf falling onto the floor or being sprayed onto the wall or door, and without taking the hinge apart. The hinge lubrication devices described herein also allow for a user to directly apply the lubricant to the hinge using an external force (e.g., a force caused by pressurized air, by a user squeezing the device to causes lubricant to be distributed from an absorption material, by a mechanical element that cases lubricant to be distributed from an absorption material, or by any other applied force) to cause the liquid to move into narrow spaces of the hinge, rather than the lubricant moving into the narrow spaces of a hinge by a capillary action. It is advantageous for a user to be able to use an external force to cause the liquid to move into the narrow spaces of a hinge to ensure that the lubricant reaches the various narrow spaces of the hinge.

The hinge lubrication devices described herein have a housing that is placed over the hinge such that the hinge is at least partially surrounded by the housing. In some embodiments, the housing has a lubrication opening for receiving lubrication. In certain embodiments, the devices have an absorption element disposed within the housing such that the absorption element engages the hinge to lubricate the hinge when the housing is placed over the hinge. The hinge lubrication devices may also have an absorption element that is disposed within the housing and below the hinge when the device is attached to the hinge, and the absorption element collects and absorbs the excess lubrication that falls off of the hinge during lubrication of the hinge.

The various embodiments of the hinge lubrication devices described herein are advantageous because a sufficient amount of lubrication can be applied to the hinge that allows the inner portions of the hinge to be properly lubricated without lubricant being applied to an adjacent wall or door, and without lubricant falling onto the floor. That is, the housing of the devices described herein prevents the lubricant from being applied to an adjacent wall or door, and prevents the lubricant from falling onto the floor.

The general inventive concepts of the present application will now be described by referencing the following exemplary embodiments. The description with reference to the following exemplary embodiments is not intended to limit the scope of the claims in any way, and the terms used in the claims have their full ordinary meaning. In addition, any feature or combination of features from each of the embodiments can be used with features or combinations of features from other embodiments. In the embodiments discussed herein, the hinge lubrication devices are described for use with a hinge for a door. However, the hinge lubrication device of the present application can be used for any type of hinge that requires lubrication.

Referring to FIGS. 1 through 4, an exemplary embodiment of a device 100 that is used for lubricating a hinge 10

Figure 2:
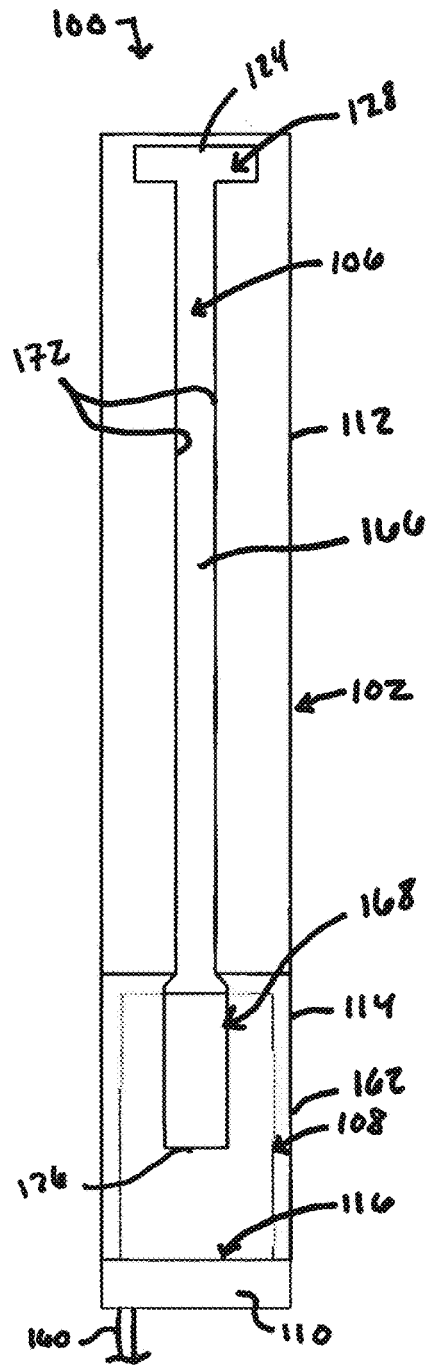
FIG. 2 is a rear schematic view of the hinge lubrication device of FIG. 1.
Figure 3:
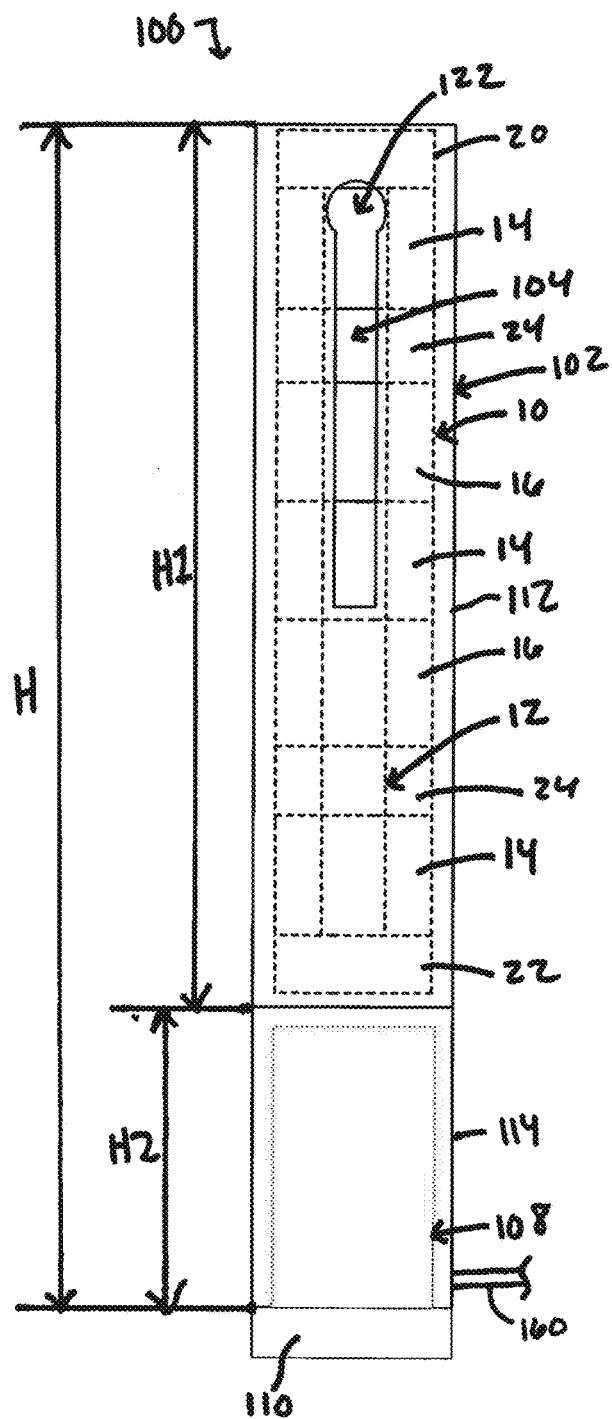
FIG. 3 is the front schematic view of the hinge lubrication device of FIG. 1, in which the hinge lubrication device is attached to a hinge.
Figure 4:
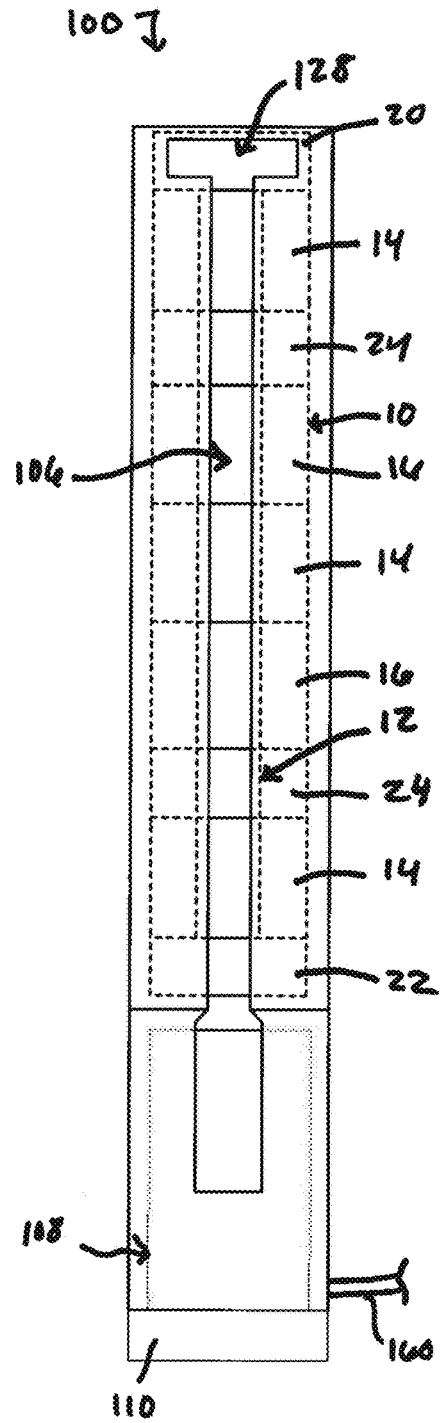
FIG. 4 is the rear schematic view of the hinge lubrication device of FIG. 1, in which the hinge lubrication device is attached to a hinge.
Figure 5:
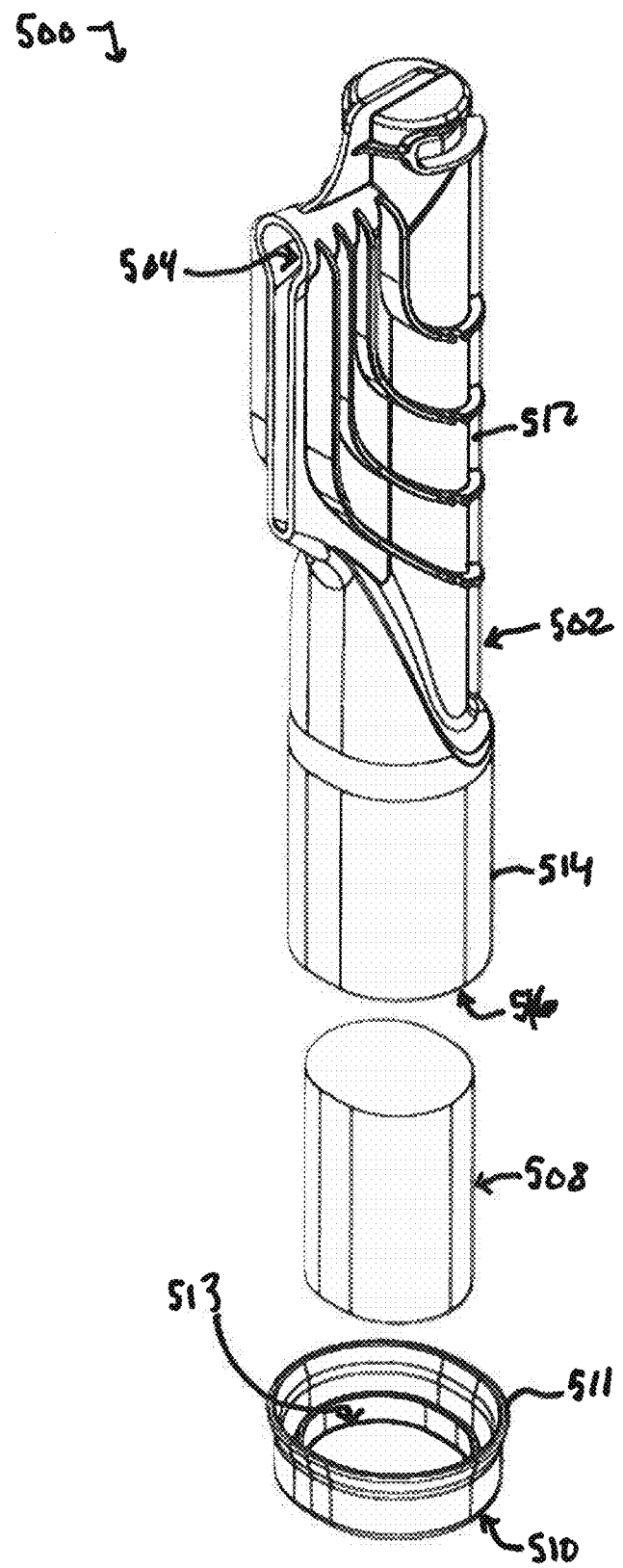
FIG. 5 is an exploded view of another exemplary embodiment of a hinge lubrication device.
Figure 6:
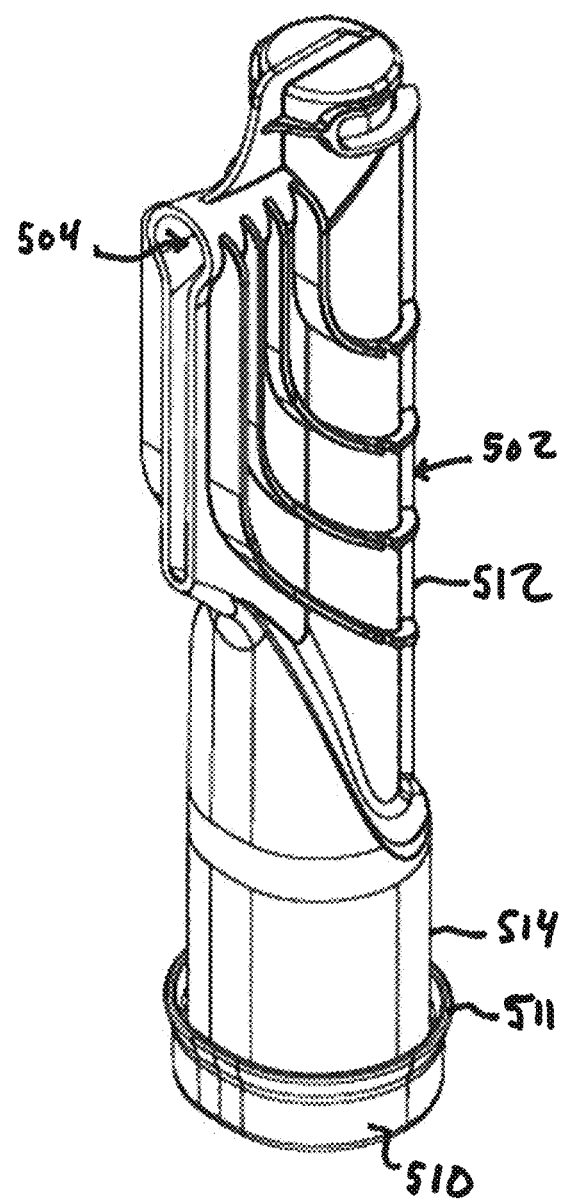
FIG. 6 is a front perspective view of the hinge lubrication device of FIG. 5.

(FIGS. 3 and 4) includes a housing 102, a lubrication opening 104, a hinge opening 106, and an absorption element 108. FIGS. 1 and 2 show the device 100 without a hinge being disposed within the device, and FIGS. 3 and 4 show the device with a hinge 10 disposed within the device. Referring to FIGS. 3 and 4, in certain embodiments, a hinge 10 has a first side plate (not shown) attached to a door, a second side plate (not shown) attached to a wall, and a pin 12. The first side plate has one or more first knuckles 14 for attaching the first side plate to the pin 12, and the second side plate has one or more second knuckles 16 for attaching the second side plate to the pin 12. The knuckles 14, 16 are hollow shafts that are placed over a shaft 18 of the pin 12, and the knuckles are maintained on the shaft by the top tip 20 and bottom tip 22 of the pin. The knuckles 14 of the first side plate (which is attached to the door that is being opened and closed) are configured to rotate about the pin to allow the door to move between opened and closed positions. In some embodiments, the hinge 10 has one or more bearings 24 for facilitating rotation of the knuckles 14 about the pin 12.

Referring to FIGS. 1-4. the housing 102 includes a first portion 112 sized for receiving a hinge 10 and a second portion 114 sized for holding the absorption element 108. The housing 102 has a height H, in which the first portion has a height H1 and the second portion has a height H2. These heights (H, H1, H2) can be a wide variety of different sizes. The first portion 112 is in fluid communication with the second portion 114, and the second portion acts as an lubrication collection chamber for collecting excess lubricant that is applied to a hinge in the first portion 112 of the housing 102. In certain embodiments, the second portion has an opening 116 such that the absorption element 108 can be removed and replaced with another absorption element. In the illustrated embodiment, the opening 116 is located at the bottom of the housing second portion 114 of the housing. In other embodiments, the opening 116 can be located in a side wall 162 of the housing 102. The first and second portions 112, 114 describe areas of the housing 102, and it should be understood that the first and second portions 112, 114 can be areas of a single part, or can be areas of separate parts that are configured to attach to each other to create the housing 102. In various embodiments, the housing 102 is made of a flexible material, such as, for example, silicone, natural rubber, urethane or other plastics, or any other type of suitable flexible material. In some embodiments, a portion of the housing can be made from a rigid material and another portion of the housing can be made from a flexible material. For example, the portion of the housing 102 having one or more of the openings 104, 106 can be made of flexible material, while other portions of the housing 102 can be made of a flexible material or a rigid material.

In the illustrated embodiment, the device 100 includes a cap 110 that is configured to attach to the second portion 114 of the housing 102 such that the opening 116 for receiving the absorption element is covered to maintain the absorption element 108 in the housing 102. The cap 110 can attach to the housing by any suitable type of connection, such as, for example, a friction fit connection, a snap fit connection, a hook and loop connection, or any other suitable type of connection. The cap 110 can be made of, for example, plastic, metal, hard rubber, wood, glass, or any other type of suitable material. In embodiments in which the opening 116 is located on the side wall 162 of the housing, or in which the housing does not have an opening 116 for removing and replacing the absorption element 108, the device 100 may not have a cap 110.

The absorption element 108 is configured to collect and absorb lubricant that is placed into the housing 102 of the device 100 during lubrication of the hinge 10. The absorption element 108 can take any suitable form that is capable of being disposed within the second portion 114 of the housing 102, such as, for example, a sheet of material that is rolled into a cylindrical shape, a material that is formed into a cylindrical shape, a material that is rolled or formed into any other shape that corresponds to the shape of the second portion 114 of the housing 102, or any other suitable shape. Alternatively, the absorption element 108 can include granular material that is inserted into the interior volume of the second portion 114 such that the granular materials take the shape of the second portion to trap and absorb any excess lubricant. The absorption element 108 can be made of any material that is capable of absorbing lubricant, such as, for example, cotton, sponges, chemical compounds, sand, cellulose, cat litter, clay absorbents, etc.

The lubrication opening 104 is configured to receive a straw of an aerosol lubricant spray container such that the aerosol lubricant spray container can be used to apply lubricant to a hinge. The lubrication opening 104 has a top end 118 and a bottom end 120, and the opening 104 extends from the top end to the bottom end along the height H of the housing 102. In the illustrated embodiment, the opening 104 is only disposed on the first portion 112 of the housing 102. In other embodiments, the top end 118 of the opening 104 be disposed on the first portion 112, and the bottom end 120 of the opening can be disposed on the second portion 114 such that the opening extends from the first portion 112 to the second portion 114.

In certain embodiments, the opening 104 includes an elongated slot 164 and a wider opening 122 that has a width that is greater than the width of the other portions of the opening 104. In certain embodiments, the wider opening 122 is sized for receiving a door stop (not shown) that is attached to a hinge assembly. The wider opening 122 can also allow a user to insert a straw or nozzle of an aerosol lubricant spray container, a valve of the aerosol lubricant spray container to which the straw or nozzle is attached, or a straw, nozzle, or valve of another type of lubrication device into the wider opening 122 such that the lubrication device can provide lubrication to the hinge 10. Once the spray container is in the wider opening 122 of the opening, the spray container can be moved to any point along the opening 104 because of the flexible material of the housing 102, which allows a user to provide lubrication to multiple locations of the hinge 10. In the illustrated embodiment, wider opening 122 is located at the top 118 of the opening 104. The wider opening 122 can, however, be located at any portion of the opening 104 that corresponds to the location of a door stop for a hinge assembly.

The hinge opening 106 is configured to receive a hinge such that the hinge is disposed within the housing 102 of the device 100. The hinge opening 106 has a top end 124, a bottom end 126, and sides 172. The opening 106 extends from the top end to the bottom end along the height of the housing 102. In the illustrated embodiment, the top end 124 of the opening 106 is disposed on the first portion 112, and the bottom end 126 of the opening can be disposed on the second portion 114 such that the opening 106 extends from the first portion 112 to the second portion 114. It is advantageous to have the opening 106 extend into the second portion 114 so that a user can examine the absorption element through the opening 106 to determine whether the absorption element 108 needs to be removed and replaced. In various embodiments, the bottom of the opening 106 includes a wider opening 168 that helps the opening 106 to flex when receiving a hinge 10, or helps the opening 106 to flex for a user to remove the absorption element 108 from the housing 102 (e.g., if the housing does not have an opening 116 for removing the absorption element). In certain embodiments, the opening 106 includes an elongated slot 166 and a wider opening 128 proximate the top of the opening 106 that has a width that is greater than the width of the other portions of the opening. The wider opening 128 may be shaped to correspond to the top tip 20 of the pin 12, or may be shaped such that the opening 106 can flex to receive a hinge 10.

Referring to FIGS. 3 and 4, an exemplary method of lubricating a hinge 10 includes placing the hinge lubrication device 100 onto the hinge 10. The hinge lubrication device 100 is placed onto the hinge 10 by aligning the hinge opening 106 with the hinge and providing a force to the device such that the hinge enters the housing 102. In some embodiments, the wider opening 128 of the hinge opening 106 is aligned with the top tip 20 of the hinge 10 prior to forcing the device onto the hinge. In the illustrated embodiment, the hinge opening 106 is smaller than the hinge 10 such that a force needs to be provided to the device 100 to cause the material of the housing 102 to flex and allow the hinge to move through the opening 106. It is advantageous to have a portion of the opening 106 extend into the second portion 114 of the housing 102 to facilitate flexing of the opening 106 when the hinge 10 is being placed into the device 100. After the hinge 10 is in the housing 102 of the device 100, the flexible material of the housing 102 moves back to its normal position such that the housing prevents the hinge from moving back through the opening 106 without a force from a user. The sides 172 of the opening 106 may be configured to enclose the hinge to prevent lubricant overspray from leaving the device 100 during lubrication of the hinge. In other embodiments, the opening 106 is larger than the hinge 10, and the device 100 remains on the hinge 10 by the gravitational force provided on the device.

After the hinge lubrication device 100 is placed on the hinge 10, the method includes providing lubricant into the housing 102 through the lubrication opening 104. The lubrication can be provided to various locations of the hinge such that the lubricant can move between the various parts (e.g., the knuckles 14, 16, the bearings 24, the shaft 12, the top tip 20, the bottom tip 22) of the hinge 10. Excess lubricant will move downward through the housing 102 until it is collected and absorbed by the absorption element 108.

In certain embodiments, the hinge lubrication device 100 includes a hose or tube 160 that is in fluid communication with the housing 102 such that excess lubricant can move from the housing, through the tube 160, and into a separate receptacle (not shown) from the housing. This allows a user to collect the excess lubricant such that the excess lubricant can be re-used, to collect lubricant in volumes large than the second portion 114 of the housing 102 was designed to accommodate, and to lubricate many hinges without needing to replace the absorption element 108 or empty the collected lubricant from the housing 102. Referring to FIGS. 1 and 2, in some embodiments, the tube 160 can be attached to the cap 110. Referring to FIGS. 3 and 4, in other embodiments, the tube 160 can be attached to the second portion 114 of the housing 100.

After the hinge 10 is sufficiently lubricated, the hinge lubrication device 100 is removed by providing a pulling force to the device such that the hinge 10 moves through the hinge opening 106 of the device. The sides 172 of the hinge opening 106 may be configured to wipe excess lubricant off of the hinge as they are pulled across the hinge during the removal process. That is, the sides 172 can act as a squeegee device that wipes excess lubricant from the hinge when the device 100 is removed from the hinge. After the device 100 is removed from the hinge 10, the user can determine whether the absorption element needs to be replaced. If the absorption element 108 does not need to be replaced, the user can use the hinge lubrication device to lubricate another hinge. If the absorption element needs to be replaced, the user can remove the cap 110 from the housing 102, remove the absorption element 108, and replace the absorption element with a new absorption element prior to lubricating another hinge.

Referring to FIGS. 5-11, another exemplary embodiment of a hinge lubrication device 500 for lubricating a hinge (e.g., hinge 10 shown in FIGS. 3 and 4) is shown (which is a more specific embodiment of the hinge lubrication device shown in FIGS. 1-4). The hinge lubrication device 500 includes a housing 502, a lubrication opening 504, a hinge opening 806 (FIG. 8), an absorption element 508, and a cap 510. The housing 502 includes a first portion 512 that is sized for holding a hinge and a second portion 514 that is sized for holding the absorption element 508. The first portion 512 is in fluid communication with the second portion 514, and the second portion 514 acts as a lubrication collection chamber for collecting excess lubricant that is applied to a hinge in the first portion 512 of the housing 502. The second portion has an opening 516 such that the absorption element 508 can be removed and replaced with another absorption element. In the illustrated embodiment, the first and second portions 512, 514 are a single part. In other embodiments, the first and second portions 512, 514 can be separate parts that are configured to attach to each other to create the housing 502. In various embodiments, the housing 502 is made of a flexible material, such as, for example, silicone, natural rubber, urethane or other plastics, or any other type of suitable flexible material. In some embodiments, a portion of the housing can be made from a rigid material and another portion of the housing can be made from a flexible material. For example, the portion(s) of the housing 502 having one or more of the openings 504, 806 can be made of flexible material, while other portions of the housing 502 can be made of a flexible material or a rigid material.

The cap 510 is configured to attach to the second portion 514 of the housing 502 such that the opening 516 for receiving the absorption element 508 is covered to maintain the absorption element in the housing 502. In the illustrated embodiment, the cap 510 attaches to the housing 502 by a friction fit connection. That is, the second portion 514 of the housing 502 is wider than the cap 510 such that housing flexes to fit within the cap, and the cap is maintained on the housing by the force of the housing trying to move back to its normal position. In certain embodiment, the cap 510 includes an edge 511 that is wider than the second portion 514 of the housing 502, but the width of the cap gradually decreases from the edge 511 until width of the cap is less than the width of the second portion of the housing. This facilitates flexing of the housing 502 such that the cap 510 can extend over and attach to the housing. In various embodiments, the cap 510 includes a receiving portion 513 for receiving the absorption element 508. In these embodiments, the absorption element 508 can be placed in the receiving portion 513 of the cap 510, and the cap 510 can be attached to the housing 502, such that the absorption element is disposed in the second portion 514 of the housing. The cap 510 can be made of, for example, plastic, metal, hard rubber, wood, glass, or any other type of suitable material.

The absorption element 508 is configured to collect and absorb lubricant that is placed into the housing 502 of the device 500 during lubrication of the hinge. The absorption element 508 can take any suitable form that is capable of being disposed within the second portion 514 of the housing 502, such as, for example, a sheet of material that is rolled into a cylindrical shape, a material that is formed into a cylindrical shape, a material that is rolled or formed into any other shape that corresponds to the shape of the second portion 514 of the housing 502, or any other suitable shape. Alternatively, the absorption element 508 can include granular material that is inserted into the interior volume of the second portion 514 such that the granular materials take the shape of the second portion to trap and absorb any excess lubricant. The absorption element 508 can be made of any material that is capable of absorbing lubricant, such as, for example, cotton, sponges, chemical compounds, sand, cellulose, cat litter, clay absorbents, etc.

Figure 7:
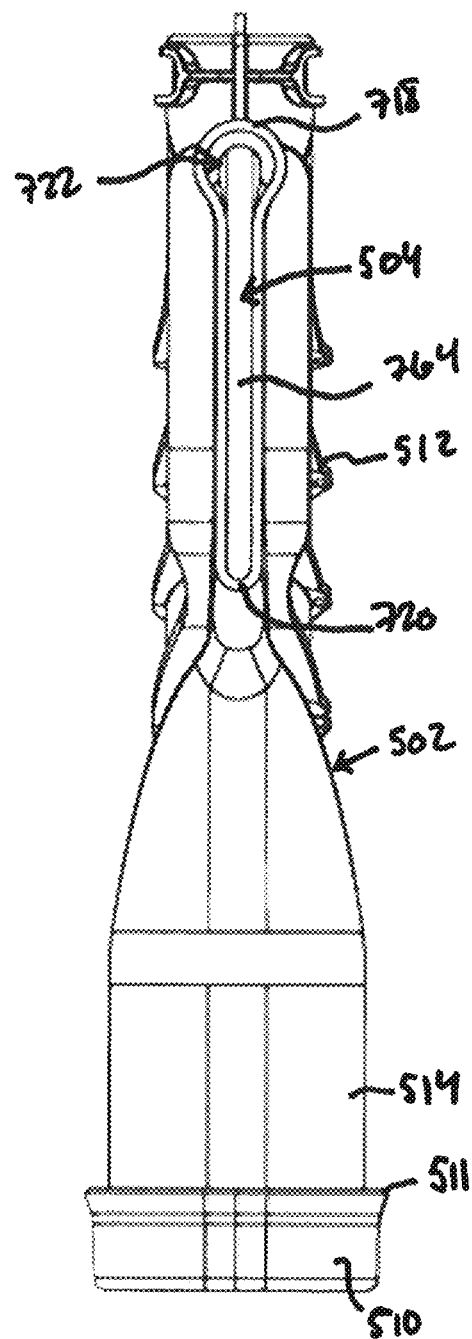
FIG. 7 is a front view of the hinge lubrication device of FIG. 5.
Figure 8:
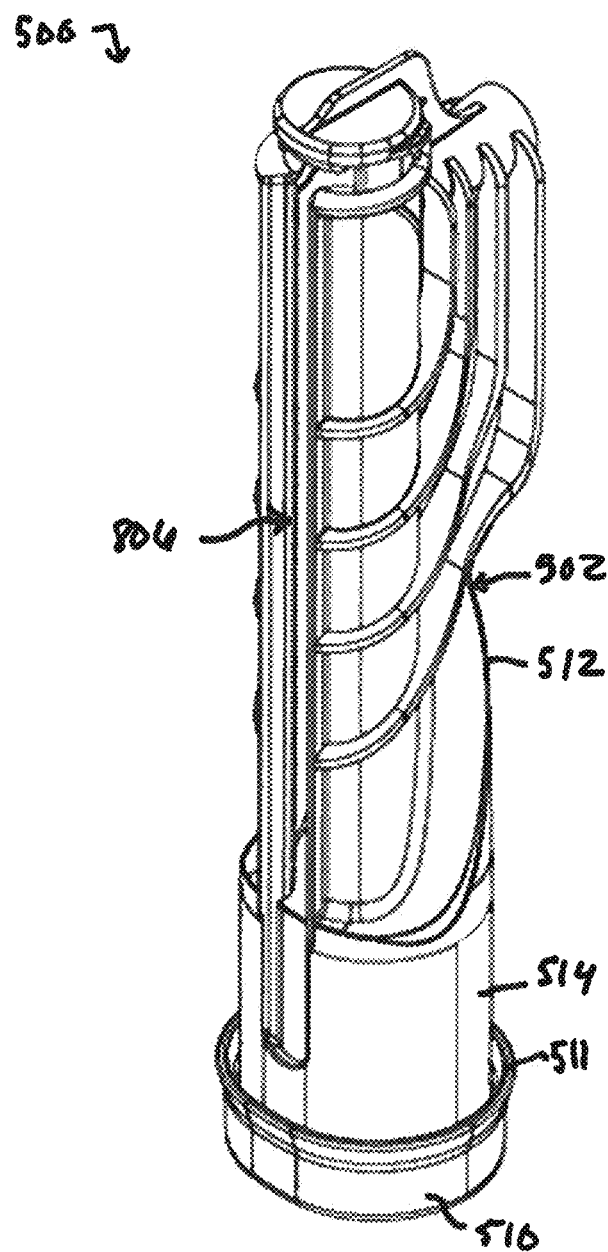
FIG. 8 is a rear perspective view of the hinge lubrication device of FIG. 5.

Referring to FIG. 7, the lubrication opening 504 is configured to receive a straw of an aerosol lubricant spray container such that the aerosol lubricant spray container can be used to apply lubricant to a hinge. The lubrication opening 504 has a top end 718 and a bottom end 720, and the opening 504 extends from the top end to the bottom end along the height of the housing 502. The opening 504 is disposed on the first portion 512 of the housing 502. In other embodiments, the top end 718 of the opening 504 be disposed on the first portion 512, and the bottom end 720 of the opening can be disposed on the second portion 514 such that the opening extends from the first portion 512 to the second portion 514.

In certain embodiments, the opening 504 includes an elongated slot 764 and a wider opening 722 that has a width that is greater than the width of the other portions of the opening 504. In certain embodiments, the wider opening 722 is sized for receiving a door stop (not shown) that is attached to a hinge assembly. In the illustrated embodiment, the wider opening 722 has a round shape. In other embodiments, the wider opening 722 can take any other suitable form that corresponds to the shape of a door stop of a hinge assembly, or any other suitable form that allows the wider opening 722 to receive a door stop of a hinge assembly. Once the nozzle of the lubrication device is in the wider opening 722 of the opening 504, the nozzle of the lubrication device can be moved to any point along the opening 504 because of the flexible material of the housing 502, which allows a user to provide lubrication to multiple locations of a hinge. In the illustrated embodiment, wider opening 722 is located at the top 718 of the opening 504. The wider opening 722 can, however, be located at any portion of the opening 504 that corresponds to the location of a stopper for a hinge assembly.

Figure 9:
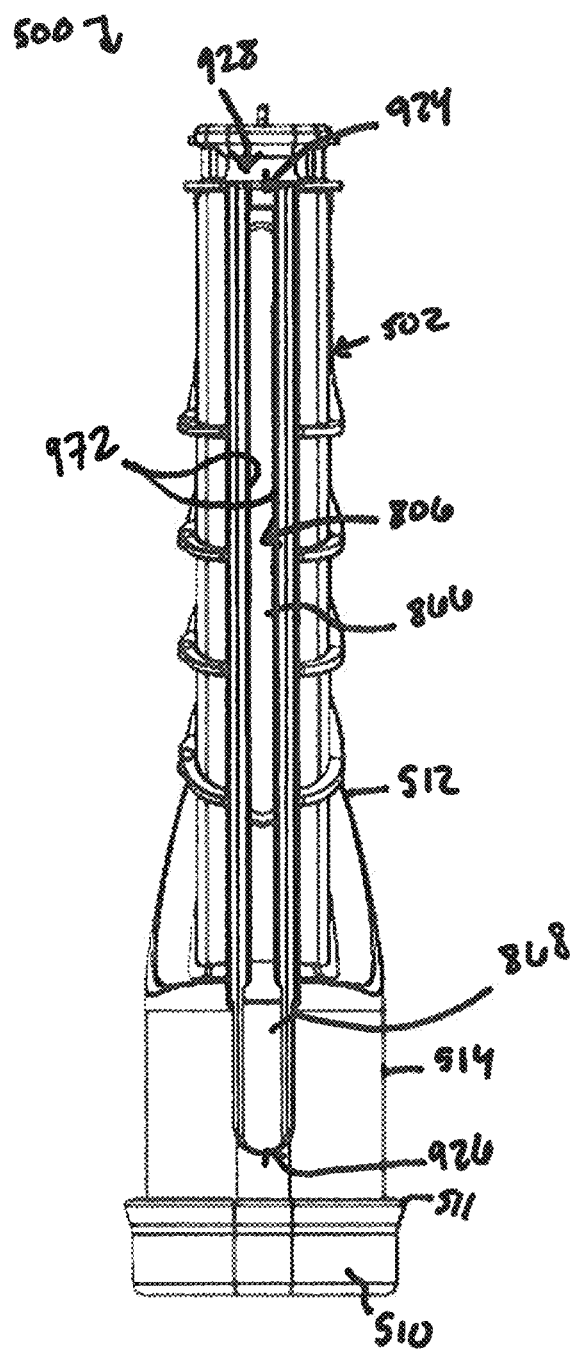
FIG. 9 is a rear view of the hinge lubrication device of FIG. 5.
Figure 10:
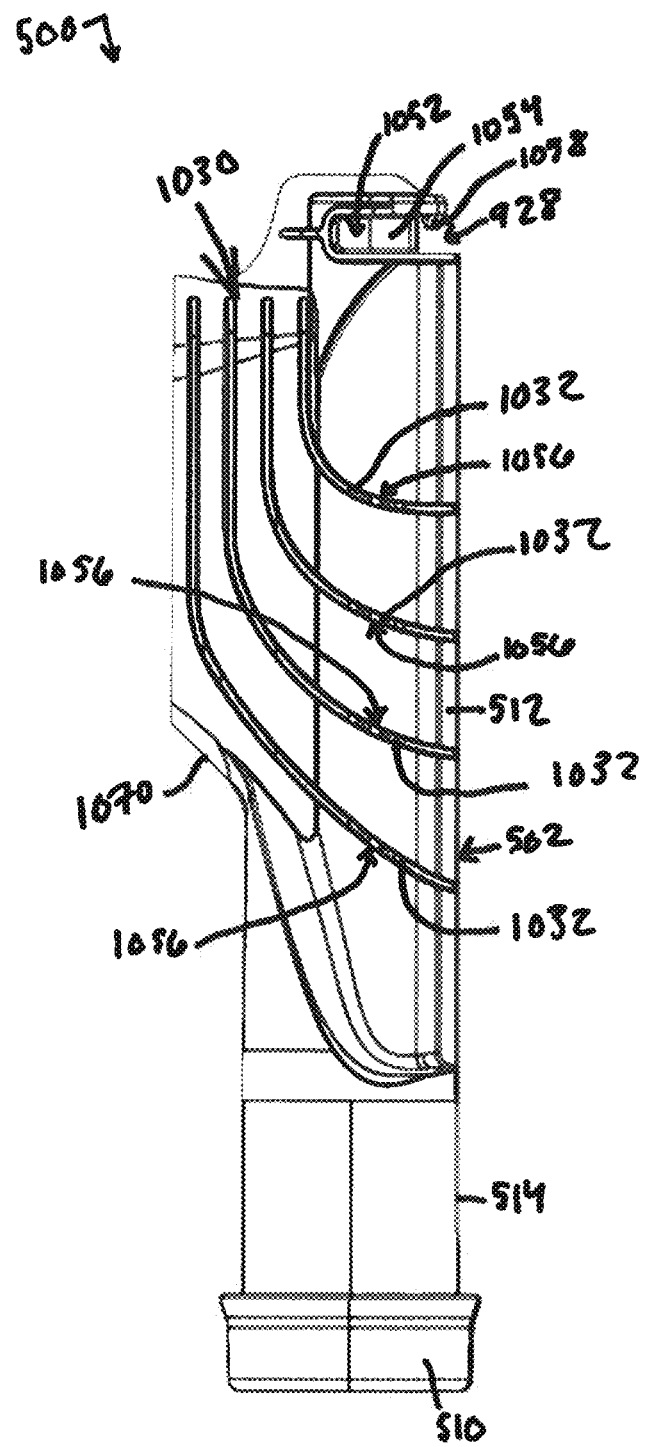
FIG. 10 is a right side view of the hinge lubrication device of FIG. 5.

Referring to FIG. 9, the hinge opening 806 is configured to receive a hinge such that the hinge is disposed within the housing 502 of the device 500. The hinge opening 806 has a top end 924, a bottom end 926, and sides 972. The opening 806 extends from the top end to the bottom end along the height of the housing 502. In the illustrated embodiment, the top end 924 of the opening 806 is disposed on the first portion 512, and the bottom end 926 of the opening is be disposed on the second portion 514 such that the opening 806 extends from the first portion 512 to the second portion 514. It is advantageous to have the opening 806 extend into the second portion 514 so that a user can examine the absorption element 508 to determine whether the absorption element 508 needs to be replaced. In the illustrated embodiment, the bottom of the opening 806 has a wider portion 868 that helps the opening 806 to flex when receiving a hinge, or helps the opening 806 to flex for a user to remove the absorption element 508 from the housing 502 (e.g., if the housing does not have an opening 116 for removing the absorption element). In certain embodiments, the opening 806 includes an elongated slot 866 and a wider opening 928 proximate the top of the opening 806 that has a width that is greater than the width of the other portions of the opening. The wider opening 928 may be shaped to correspond to the shape of the top tip of a pin of a hinge, or may be shaped such that the opening 806 can flex to receive a hinge. Referring to FIGS. 9 and 10, in various embodiments, the housing 502 includes a lip 1058 (FIG. 10) that extends into the top end 924 of the opening 806 to prevent a hinge from moving out of the hinge lubrication device 500 through the opening 806 during use of the hinge lubrication device. The lip 1058 also helps contain any spray lubricant directed upwardly during use of the hinge lubrication device from exiting through the opening 806. The sides 972 of the opening 806 may be configured to enclose the hinge to prevent lubricant overspray from leaving the device 100 during lubrication of the hinge, and may be configured to wipe excess lubricant off of the hinge as the sides 972 are pulled across the hinge during the removal process of the device 100.

Referring to FIG. 10, in certain embodiments, the first portion 512 of the housing 502 has a door stop opening 1052 for receiving door stops that are attached to the hinge. In certain embodiments, the first portion 512 includes one or more curtains 1054 that extends over the door stop opening 1052. When the hinge lubrication device 500 is attached to a hinge having a door stop, the curtain 1054 encloses a door stop within the door stop opening 1052 to prevent lubricant from being sprayed out of the door stop opening and onto the door. In certain embodiments, one side of each of the one or more curtains is attached to the first portion 512 of the housing 502 such that, when the curtain is engaged by a door stop, the curtain pivots relative to the housing to allow the door stop to enter door stop opening 1052. After the door stop enters the door stop opening 1052, the one or more curtains pivots back toward its normal position to enclose the door stop within the door stop opening 1052. The one or more curtains 1054 are made of a flexible material, such as, for example, silicone, natural rubber, urethane or other plastics, etc.

Still referring to FIG. 10, in certain embodiments, the housing 502 of the hinge lubrication device 500 includes an extended member 1030 that extends from the first portion 512 of the housing. The extended member 1030 provides a user with a gripping area for placement and removal of the device 500. In the illustrated embodiment, the extended member 1030 includes one or more grippers 1032 to help a user grip the device 500. The grippers 1032 can take any suitable form that allow a user to better grip the device 500, such as, for example, one or more protrusions, ribs, bumps, ripples, studs, etc. In the illustrated embodiment, the grippers 1032 extend over both the first portion 512 of the housing 502 and the extended member 1030. In other embodiments, the grippers 1032 may only be disposed on the extended member, or the grippers may be disposed on any other portion of the housing 502 that allows a user to grip the device 500.

In certain embodiments, the lubricant opening 504 is disposed on the extended member 1030, and the extended member is in fluid communication with the interior of the first portion 512 of the housing 502. It is advantageous to have the lubricant opening 504 be disposed on the extended member 1030 because the hinge will be further away from the opening 504 (as compared to a hinge lubrication device that does not have extended member 1030) during lubrication of a hinge, which can prevent lubricant from splashing back through the opening 504 after contacting the hinge.

Figure 11:
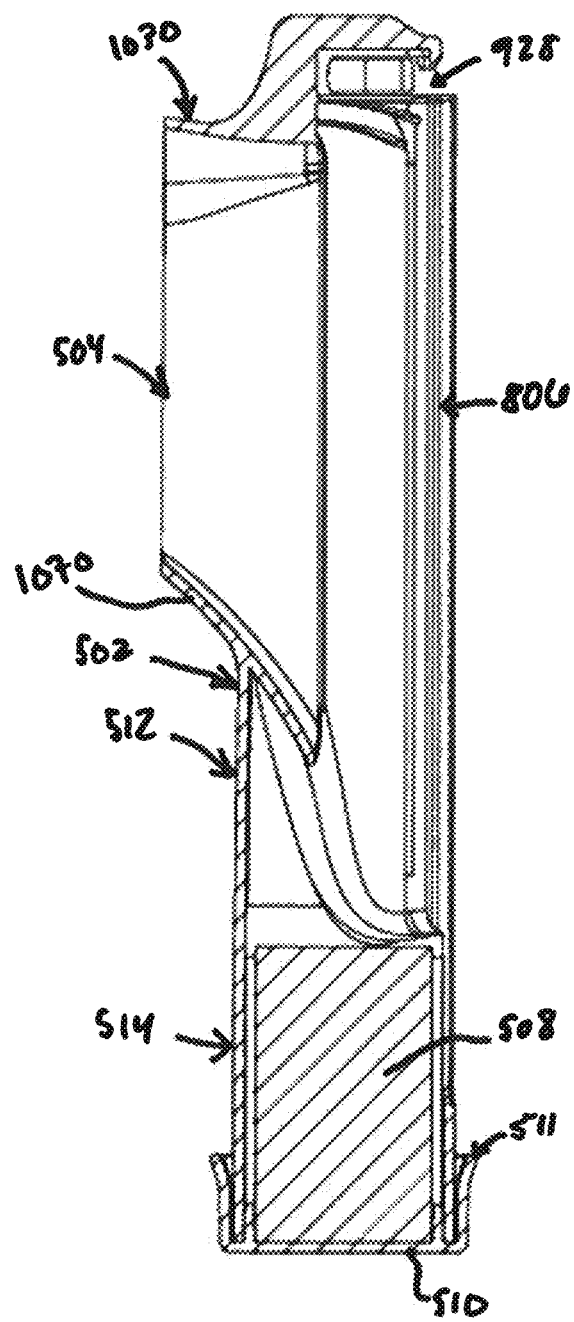
FIG. 11 is a cross-sectional side view of the hinge lubrication device of FIG. 5.

Referring to FIGS. 10 and 11, in certain embodiments, a bottom portion of the extended member 1030 includes a downward slope 1070. The downward slope 1070 allows a user to angle a straw of an aerosol lubricant spray container downward to better apply lubricant to a lower portion of a hinge. The downward slope 1070 also causes any excess lubricant in the extended member 1030 to move from the extended member and into the second portion 514 of the housing such that the lubricant can be absorbed by the absorption element 508.

Referring to FIG. 10, in certain embodiments, the housing 502 includes one or more straw holders for holding an extra straw (not shown) that is used with an aerosol lubricant spray container. This allows a user to replace the original straw of an aerosol lubricant spray container if the original straw is lost or damaged, or if a user desires a new straw. In the illustrated embodiment, the straw holder includes various aligned channels 1056 of the one or more grippers 1032, which are aligned such that a portion of the extra straw is attached to one or more of the various aligned channels. The channels 1056 are sized such that a straw can be inserted into the channels and remain in the channels. For example, the straw can remain in the channels 1056 by a friction fit connection, a snap fit connection, or any other suitable connection that allows the straw to be easily inserted into and removed from the channels. In the illustrated embodiment, each of the grippers 1032 include a single channel 1056 for receiving a single straw. In other embodiments, each of the grippers 1032 can include more than one channel 1056 such that more than one straw can be attached to the housing 502. While the straw holder of the illustrated embodiment is shown on the grippers 1032, it should be understood that one or more straws can be attached to any other suitable location on the housing.

Figure 12:
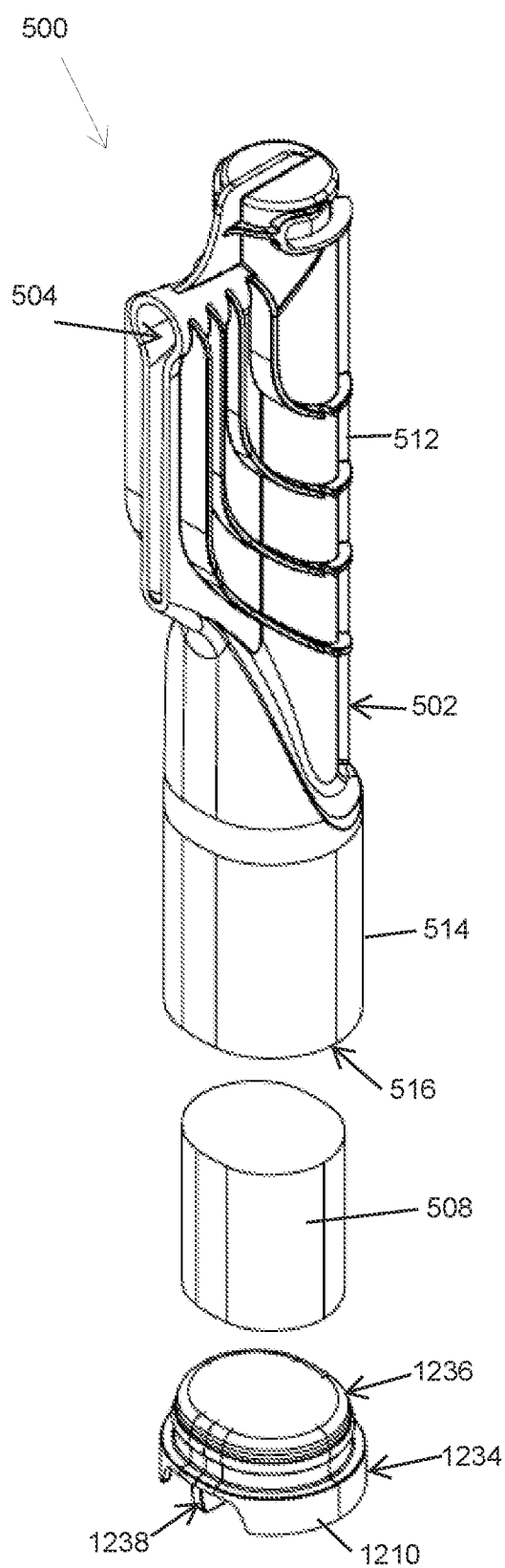
FIG. 12 is an exploded view of the hinge lubrication device of FIG. 5, in which hinge lubrication device includes a second exemplary embodiment of a cap.
Figure 13:
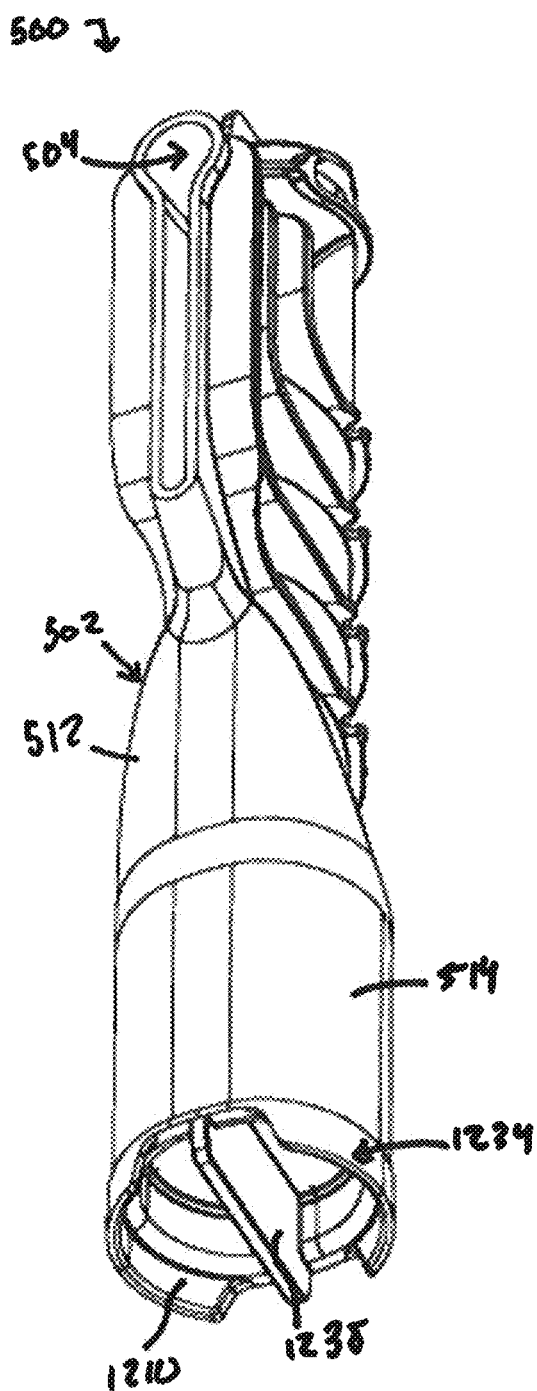
FIG. 13 is a perspective view of the hinge lubrication device of FIG. 5 with the cap of FIG. 12.
Figure 14:
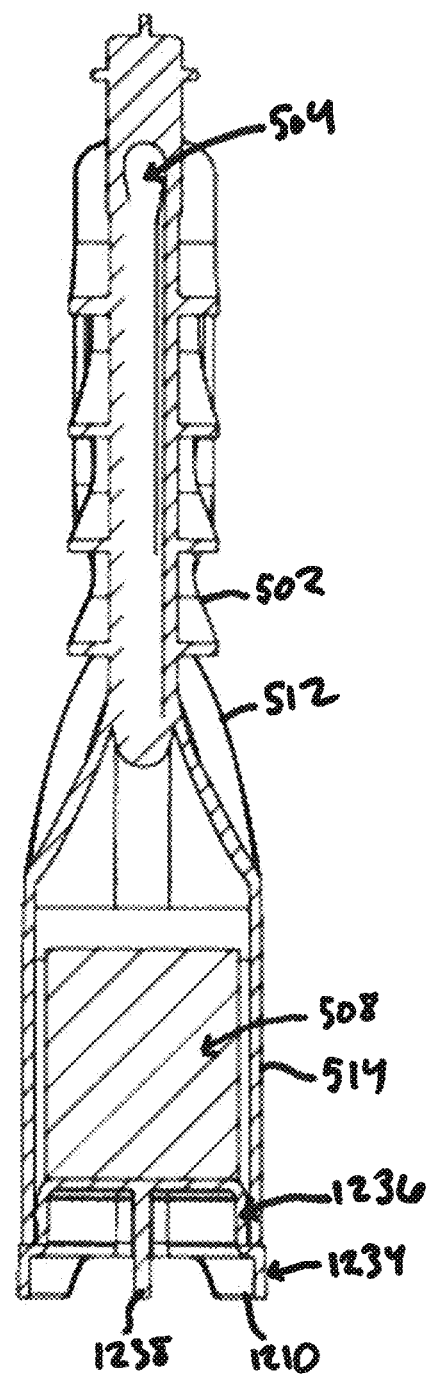
FIG. 14 is a cross-sectional front view of the hinge lubrication device of FIG. 5 with the cap of FIG. 12.
Figure 15:
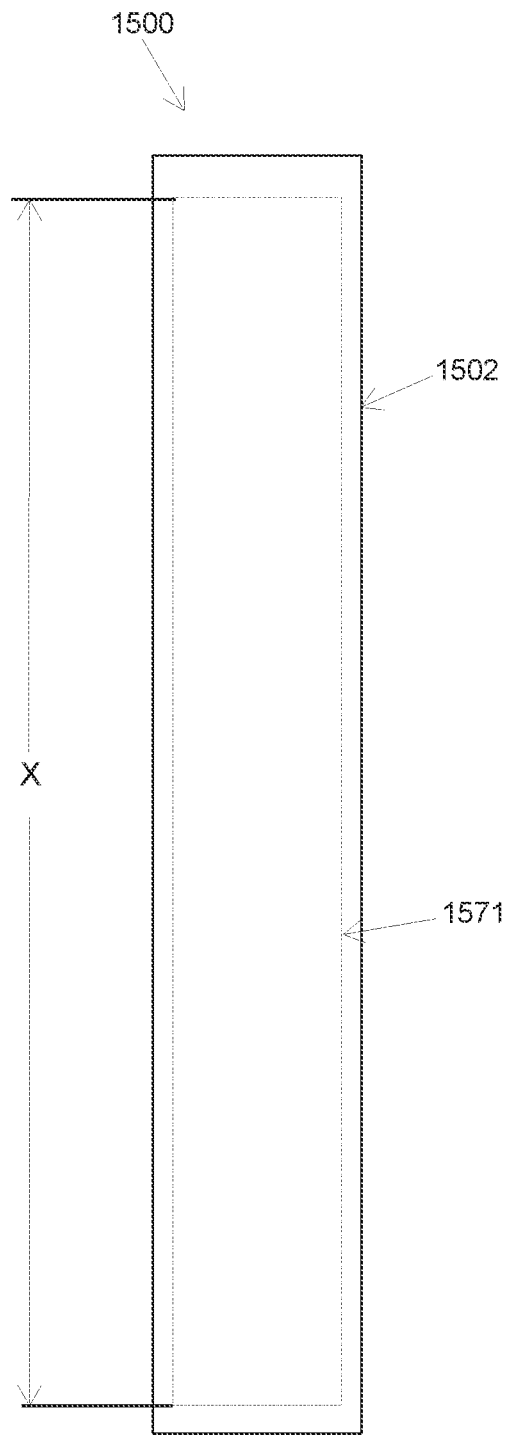
FIG. 15 is a front schematic view of another exemplary embodiment of a hinge lubrication device.
Figure 16:
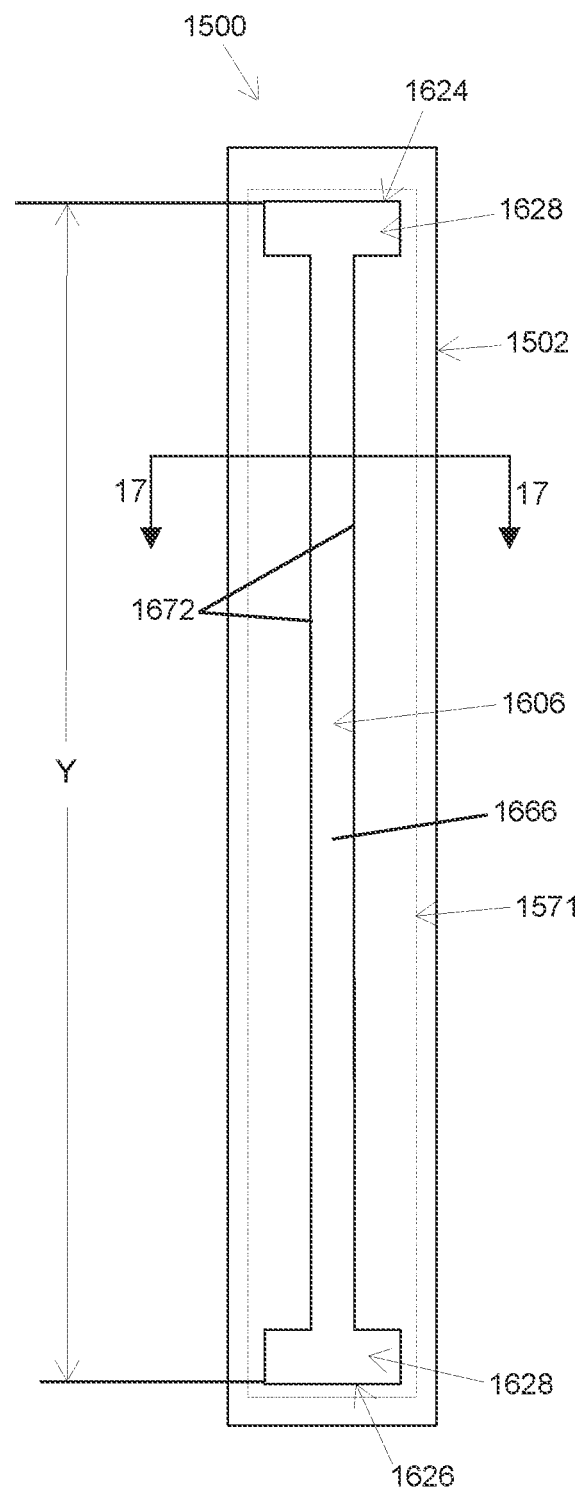
FIG. 16 is a rear schematic view of the hinge lubrication device of FIG. 15.

Referring to FIGS. 12-14, another exemplary embodiment of a cap 1210 that can be used for the hinge lubrication device 500 (FIGS. 5-11). The cap 1210 is configured to attach to the second portion 514 of the housing 502 such that the opening 516 for receiving the absorption element 508 is covered to maintain the absorption element in the housing 502. In the illustrated embodiment, the cap 1210 includes a first portion 1234 and a second portion 1236, in which the first portion 1234 is held by a user such that the user can attach and detach the cap from the housing 502, and in which the second portion 1236 is configured to engage the interior of the second portion 514 of the housing 502 to connect the cap to the housing. That is, the second portion 1236 of the cap 1210 is wider than the interior of the housing 502 such that a user can push the second portion 1236 of the cap into the housing 502, which causes the housing to flex outward, and the cap is maintained on the housing by the force of the housing trying to move back to its normal position. In certain embodiments, the first portion 1234 of the cap 1210 includes a protrusion 1238 for a user to engage to attach or detach the cap to the housing 502. The cap 1210 can be made of, for example, plastic, metal, hard rubber, wood, glass, or any other suitable material.

Referring to FIGS. 27-30, another exemplary embodiment of a hinge lubrication device 2700 for lubricating a hinge (e.g., hinge 10 shown in FIGS. 3 and 4) is shown (which is a more specific embodiment of the hinge lubrication device shown in FIGS. 1-4). The hinge lubrication device 2700 includes a housing 2702, a lubrication opening 2804 (FIGS. 28 and 29), a hinge opening 2706, an absorption element (not shown), and a cap 2710. The housing 2702 includes a first portion 2712 that is sized for holding a hinge and a second portion 2714 that is sized for holding the absorption element. The first portion 2712 is in fluid communication with the second portion 2714, and the second portion 2714 acts as a lubrication collection chamber for collecting excess lubricant that is applied to a hinge in the first portion 2712 of the housing 502. The second portion has an opening (not shown) such that the absorption element 2708 can be removed and replaced with another absorption element.

In the illustrated embodiment, the first and second portions 2712, 2714 are a single part. In other embodiments, the first and second portions 2712, 2714 can be separate parts that are configured to attach to each other to create the housing 2702. In various embodiments, the housing 2702 is made of a flexible material, such as, for example, silicone, natural rubber, urethane or other plastics, or any other type of suitable flexible material. In some embodiments, a portion of the housing can be made from a rigid material and another portion of the housing can be made from a flexible material. For example, the portion(s) of the housing 2702 having one or more of the openings 2804, 2706 can be made of flexible material, while other portions of the housing 2702 can be made of a flexible material or a rigid material.

Figure 27:
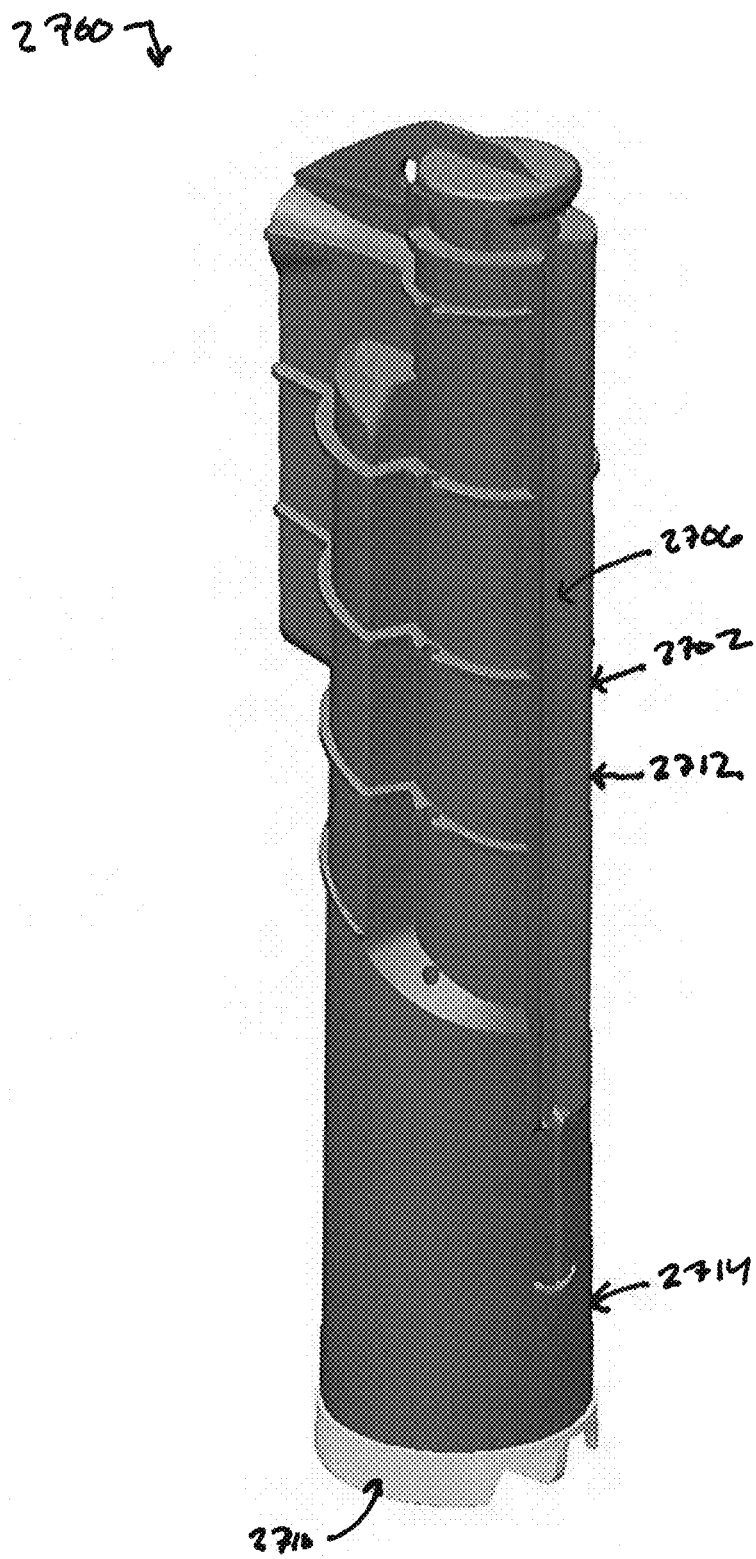
FIG. 27 is a rear perspective view of another exemplary embodiment of a hinge lubrication device.
Figure 28:
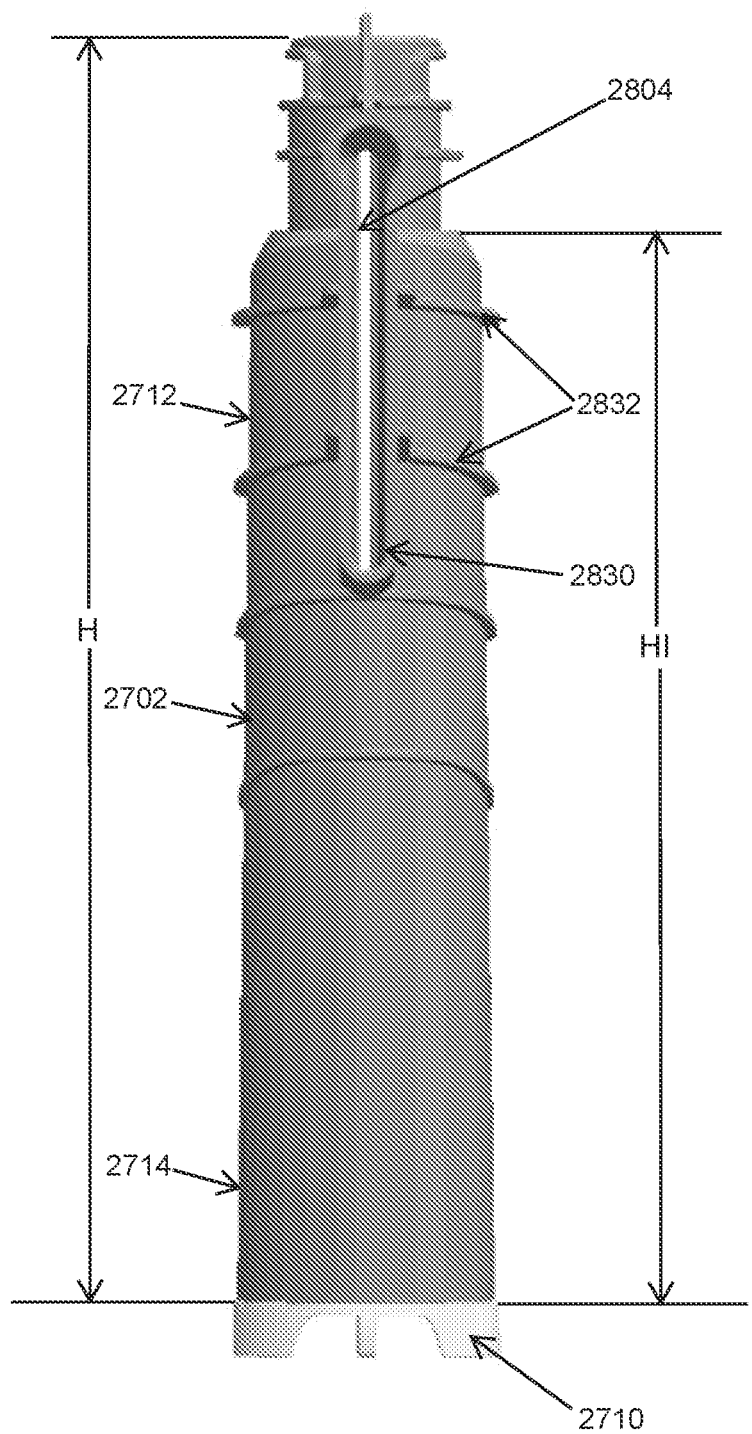
FIG. 28 is a front view of the hinge lubrication device of FIG. 27.

Referring to FIG. 28, in certain embodiments, a width W of the housing 2702 is substantially uniform along at least a portion of the height H of the device 2700 that extends from at least a portion of the second portion 2714 to at least a portion of the first portion 2712 that includes the lubrication opening 2804 and/or the hinge opening 2706 (FIG. 27). For example, a height H1 of the device 2700 may have a uniform width W when viewed by a user as the device 2700 is disposed on a hinge. The height H1 may be equal to more than 50% of the height H, such as more than 60% of the height H, such as more than 75% of the height H, such as more than 85% of the height H, such as more than 90% of the height H, such as more than 95% of the height H. This uniform width is advantageous because it provides the user with an better grip during use of the device.

Referring to FIGS. 27-30, the hinge opening 2706 is configured to receive a hinge such that the hinge is disposed within the housing 2702 of the device 500. The hinge opening 2706 may take any suitable form, such as, for example, any form described in the present application.

The lubrication opening 2804 is configured to receive a straw of an aerosol lubricant spray container such that the aerosol lubricant spray container can be used to apply lubricant to a hinge. The lubrication opening 2804 may take any suitable form, such as, for example, any form described in the present application.

The absorption element is configured to collect and absorb lubricant that is placed into the housing 2702 of the device 2700 during lubrication of the hinge. The absorption element can take any suitable form, such as, for example, any form described in the present application.

The cap 2710 is configured to attach to the second portion 2714 of the housing 2702 such that the opening for receiving the absorption element is covered to maintain the absorption element in the housing 2702. The cap 2710 may take any suitable form, such as, for example, any form described in the present application.

Figure 29:
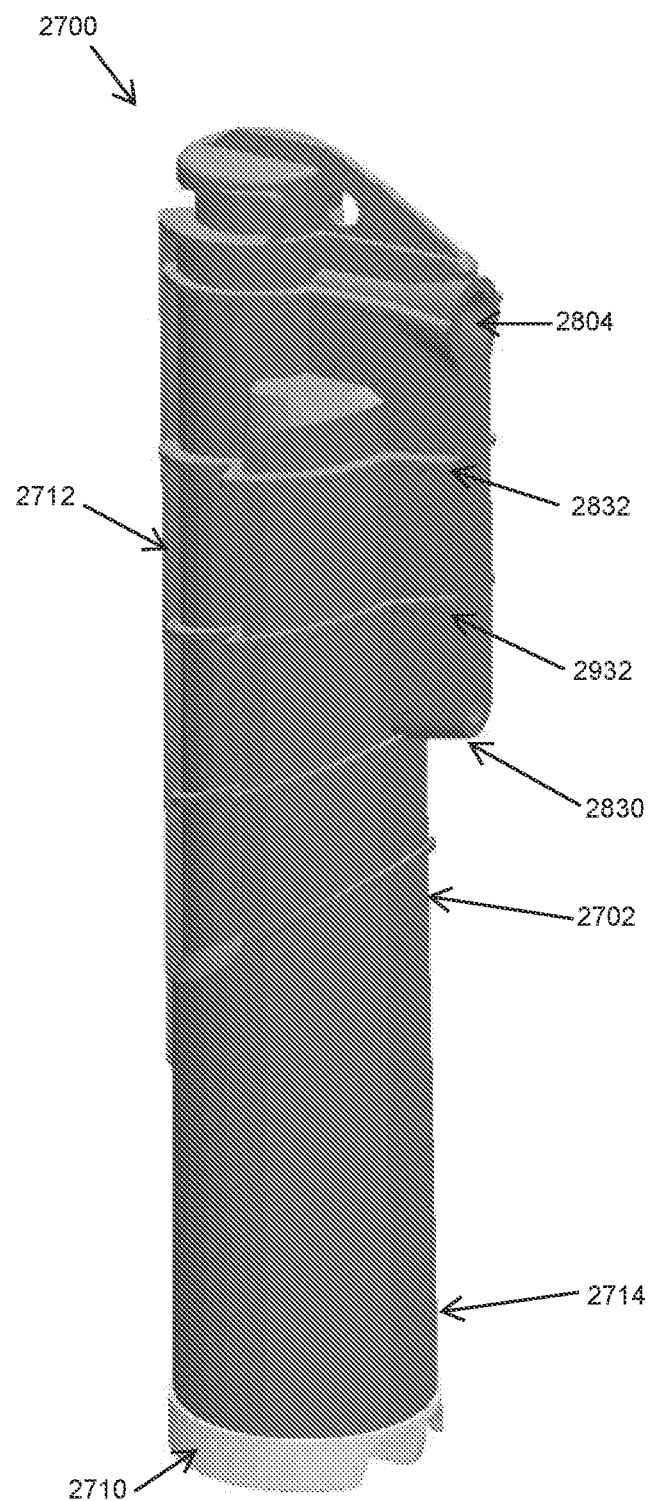
FIG. 29 is a front perspective view of the hinge lubrication device of FIG. 27.
Figure 30:
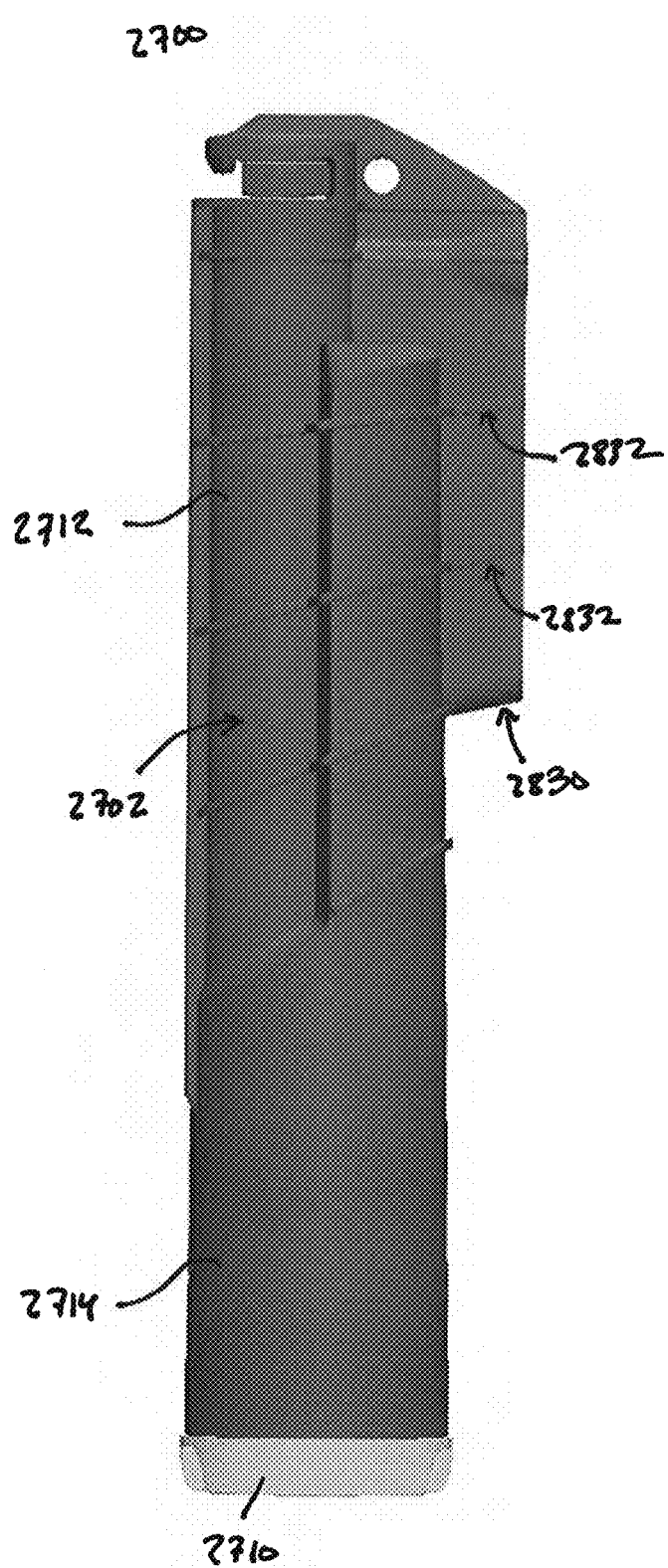
FIG. 30 is a side view of the hinge lubrication device of FIG. 27.

Referring to FIGS. 28-30, in certain embodiments, the housing 2702 of the hinge lubrication device 2700 includes an extended member 2830 that extends from the first portion 2912 of the housing. The extended member 2830 provides a user with a gripping area for placement and removal of the device 2700. In the illustrated embodiment, the extended member 2830 includes one or more grippers 2832 to help a user grip the device 2700. The grippers 2832 can take any suitable form that allow a user to better grip the device 2700, such as, for example, one or more protrusions, ribs, bumps, ripples, studs, etc. In the illustrated embodiment, the grippers 2832 extend over both the first portion 2712 of the housing 2702 and the extended member 2830. In other embodiments, the grippers 2832 may only be disposed on the extended member 2830, or the grippers may be disposed on any other portion of the housing 2702 that allows a user to grip the device 2700. In the illustrated embodiment, the exterior surface of the extended member 2830 is flat from the first portion 2712 of the housing 2702 to the straight portion of the opening 2804 (except for the grippers 2832).

Figure 31:
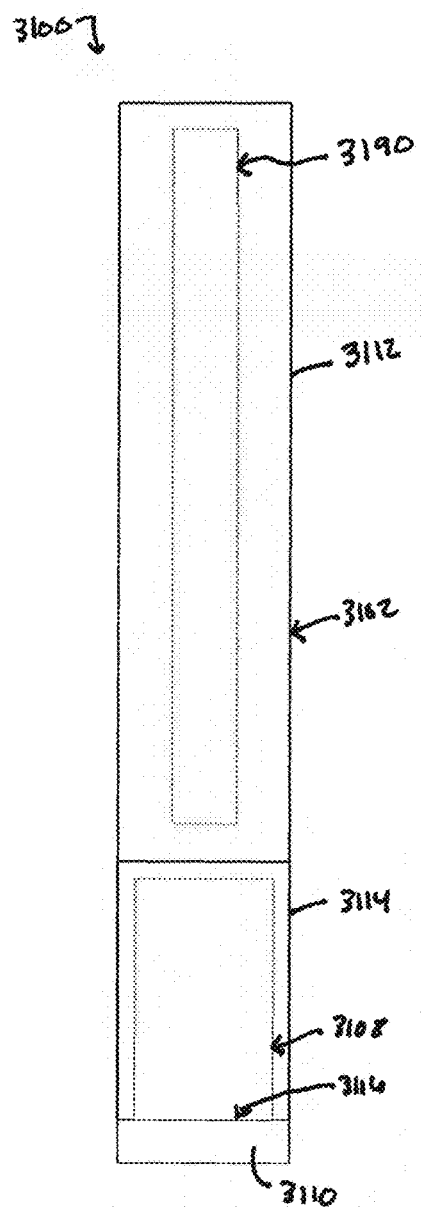
FIG. 31 is a front schematic view of another exemplary embodiment of a hinge lubrication device.
Figure 32:
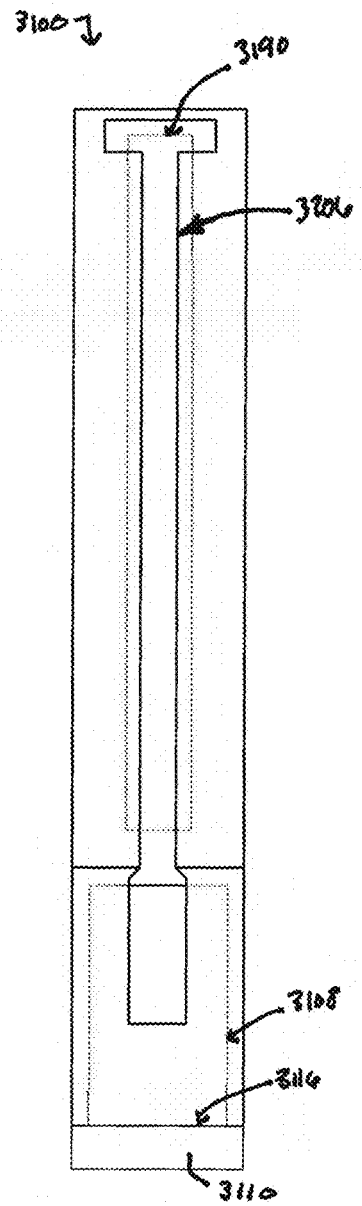
FIG. 32 is a rear schematic view of the hinge lubrication device of FIG. 32.

Referring to FIGS. 31 and 32, another exemplary embodiment of a hinge lubrication device 3100 for lubricating a hinge (e.g., hinge 10 in FIGS. 3 and 4) is shown. The hinge lubrication device 3100 includes a housing 3102, a hinge opening 3206 (FIG. 32), an absorption element 3108, a lubrication vile 3190, and a cap 3110. The housing 3102 includes a first portion 3112 that is sized for holding a hinge and a second portion 3114 that is sized for holding the absorption element 3108. The first portion 3112 is in fluid communication with the second portion 3114, and the second portion 3114 acts as a lubrication collection chamber for collecting excess lubricant that is applied to a hinge in the first portion 3112 of the housing 3102. The second portion has an opening 3116 such that the absorption element 3108 can be removed and replaced with another absorption element. In the illustrated embodiment, the first and second portions 3112, 3114 are a single part. In other embodiments, the first and second portions 3112, 3114 can be separate parts that are configured to attach to each other to create the housing 3102. In various embodiments, the housing 3102 is made of a flexible material, such as, for example, silicone, natural rubber, urethane or other plastics, or any other type of suitable flexible material. In some embodiments, a portion of the housing can be made from a rigid material and another portion of the housing can be made from a flexible material. For example, the first portion 3112 of the housing 3102 can be made of flexible material, while second portion 3114 of the housing 3102 can be made of a flexible material or a rigid material.

The hinge opening 3206 is configured to receive a hinge such that the hinge is disposed within the housing 3102 of the device 3100. The hinge opening 3206 may take any suitable form, such as, for example, any form described in the present application.

The lubrication vile 3190 may be made of a thin membrane that is configured to rupture when an external force is applied to the exterior of the thin membrane. A lubricant is disposed within the thin membrane such that the lubricant is released from the lubrication vile 3190 when the thin membrane ruptures. The thin membrane of the lubrication vile 3190 may be made of any suitable type of material that is capable of rupturing and releasing lubricant when an external force is applied to the lubrication vile 3190.

The lubrication vile 3190 is positioned within the housing 3102 such that the lubrication vile 3190 engages a hinge (e.g., hinge 10 in FIGS. 3 and 4) when the hinge lubrication device 3100 is placed on the hinge. That is, when a hinge moves into the housing 3102 through the hinge opening 3206, the hinge engages the lubrication vile 3190. This engagement between the lubrication vile 3190 and the hinge can cause the lubrication vile 3190 to rupture and release the lubricant such that the released lubricant can move through various portions of the hinge to lubricate the hinge. In some embodiments, at least a portion of the housing 3102 may be flexible such that a user can squeeze the housing to provide a force to the lubrication vile 3190 to cause the lubricant to be released from the lubrication vile 3190. The lubrication vile 3190 may be attached to the housing by any suitable means that allows the lubrication vile to be positioned within the housing 3102. For example, the lubrication vile 3190 can be attached to the housing 3102 by an adhesive. While the lubrication vile 3190 is described with respect to the device 3100, it should be understood that the lubrication vile 3190 can be used with any other suitable type of lubrication device, such as, for example, any lubrication device described in the present application.

The absorption element 3108 is configured to collect and absorb lubricant that is released from the lubrication vile 3190 during lubrication of the hinge. The absorption element 3108 can take any suitable form, such as, for example, any form described in the present application.

The cap 3110 is configured to attach to the second portion 3114 of the housing 502 such that the opening 3116 for receiving the absorption element 3108 is covered to maintain the absorption element in the housing 3102. The cap 3110 can take any suitable form, such as, for example, any form described in the present application.

FIGS. 15-18 illustrate another exemplary embodiment of a hinge lubrication device 1500 that includes a housing 1502, a hinge opening 1606, and an absorption element 1571. At least a portion of the housing 1902 may be made of a flexible material, such as, for example, silicone, natural rubber, urethane or other plastics, or any other type of suitable flexible material. The hinge opening 1606 is configured to receive a hinge (e.g., hinge 10 shown in FIGS. 3 and 4) such that the hinge is disposed within the housing 1502 of the device. The hinge opening 1606 has a top end 1624, a bottom end 1626, and sides 1672, in which the opening 1606 extends from the top end 1624 to the bottom end 1626 along a height of the housing 1502. In certain embodiments, the opening 1606 includes an elongated slot 1666 and a wider opening 1628 proximate one or both of the top end 1624 and the bottom end 1626 of the opening 1606. The wider opening(s) 1628 may be shaped to correspond to the top tip and/or the bottom tip of a hinge, or may be shaped such that the opening 1606 can flex to receive a hinge. In embodiments in which the hinge opening 1606 has two wider openings 1628 (e.g., one for aligning with the top tip and one for aligning with the bottom tip), the device 1500 may be configured such that both of the wider openings are capable of receiving either of the top or bottom tip of the hinge, which allows either end of the device 1500 to be aligned with both the top and bottom tips of the hinge.

In various embodiments, the housing 1502 includes one or more lips (e.g., lip 1058 shown in FIG. 10) that extend into the top end 1624 and/or the bottom end 1626 of the opening 1606 to prevent a hinge from moving out of the hinge lubrication device 1500 through the opening 1606 during use of the hinge lubrication device. The lip also helps contain any lubricant directed upwardly during use of the hinge lubrication device from exiting through the opening 1606.

In certain embodiments, the housing 1502 has a door stop opening (e.g., door stop opening 1052 shown in FIG. 10) for receiving door stops that are attached to the hinge. The housing 1502 may also one or more curtains (e.g., curtains 1054) that extend over the door stop opening. When the hinge lubrication device 1500 is attached to a hinge having a door stop, the curtain encloses a door stop within the door stop opening to prevent lubricant from moving out of the door stop opening and onto the door. The one or more curtains may be pivotally attached to the housing 1502 such that the curtains can pivot relative to the housing to allow the door stop to enter door stop opening. After the door stop enters the door stop opening, the one or more curtains pivot back toward its normal position to enclose the door stop within the door stop opening. The one or more curtains can be made of a flexible material, such as, for example, silicone, natural rubber, urethane or other plastics, etc.

The absorption element 1571 is configured to absorb lubricant and distribute the lubricant to a hinge when an external force is applied to the absorption element 1571. That is, lubricant can be distributed from the absorption element 1571 to a hinge by providing a force to the absorption element 1571 that causes the lubricant to dispense from the absorption element 1571. In the illustrated embodiment, the housing 1502 is made from a flexible material (e.g., silicone, natural rubber, urethane or other plastics, or any other type of suitable flexible material) such that a user can squeeze the housing to provide the necessary force to the absorption element 1571 and dispense the lubricant on to the hinge. In certain embodiments, the absorption element 1571 has a height X that is greater than or equal to the height Y of the opening 1606, which ensures that the entire hinge is engaged by the absorption element 1571 when the hinge is received by the hinge opening 1606. The absorption element 1571 can be made of any material that is capable of absorbing a lubricant and distributing the lubricant to a hinge, such as, for example, a sponge, a cloth material, or any other suitable material.

In certain embodiments, the absorption element 1571 can be pre-lubricated such that the device 1500 is ready to be used by a user upon obtaining the device. The entire absorption element 1571 may be pre-lubricated, or only a portion of the absorption element may be pre-lubricated. In some embodiments, only a portion of the absorption element that is disposed facing the portion of the housing 1502 that does not include the hinge opening 1606 is pre-lubricated. In some embodiments, a first portion of the absorption element is pre-lubricated, and a second portion of the absorption element that is disposed below the first portion is dry (or not pre-lubricated). A partially pre-lubricated absorption member can take any suitable form that is capable of distributing lubricant to a hinge and/or absorbing excess lubricant during use of the device 1500. In certain embodiments, a partially pre-lubricated absorption element allows the non-lubricated portion to absorb excess lubricant that is distributed from the pre-lubricated portion during use of the device 1500.

In embodiments in which the absorption element 1571 is pre-lubricated, a sealing member 1873 (shown in FIG. 18) may be used to prevent the pre-lubricated absorption element 1571 from drying due to exposure to environmental conditions outside of the housing 1502. The sealing member 1873 can be removably attached to the housing 1502 such that the sealing member covers the hinge opening 1606. For example, the sealing member 1873 can be attached to the housing by an adhesive (e.g., any known class of common adhesives, water-based adhesives, solvent-based adhesives, and hot-melt adhesives, etc.) or any other type of material that is capable of removably attaching the sealing member 1873 to the housing 1502. The sealing member 1873 can include one or more materials that are capable of providing an airtight seal to the housing 1502 such as, for example, glass, plastic, metal, rubber, any combination thereof, etc. In alternative embodiments, the absorption element 1571 is not pre-lubricated, but a user can lubricate the absorption element by providing lubricant to the absorption element 1571 through the hinge opening 1606 prior to placing the device 1500 onto a hinge.

The absorption element 1571 can take any suitable form that is capable of being housed within the housing 1502 and engaging a hinge to distribute lubricant to the hinge. In the illustrated embodiment, substantially the entire interior volume of the housing 1502 is filled with the absorption element 1571. In some embodiments, however, only a portion of the interior volume of the housing 1502 is filled by the absorption element 1571. In these embodiments, the a portion of the housing 1502 may define a collection reservoir for receiving excess lubricant that is dispensed from the absorption material 1571.

Figure 17A:
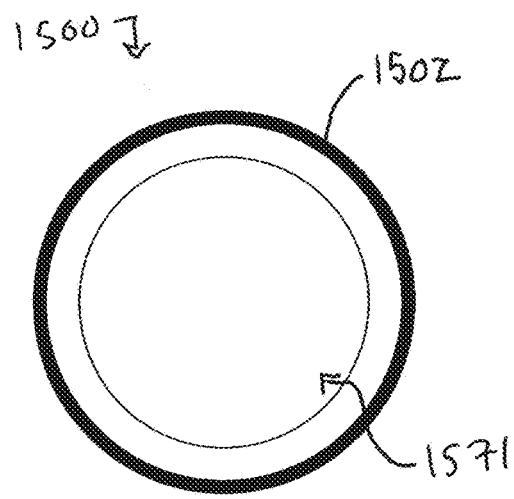
FIG. 17A is a cross-sectional view of the hinge lubrication device of FIG. 15 taken along the lines 17-17 shown in FIG. 16, showing an exemplary embodiment of an absorption element.
Figure 17B:
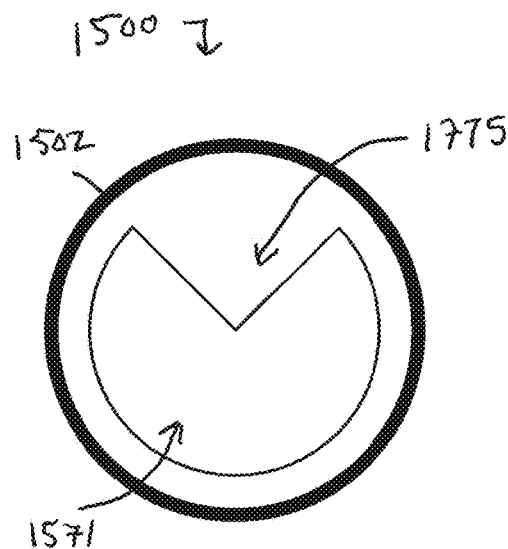
FIG. 17B is a cross-sectional view of the hinge lubrication device of FIG. 15 taken along the lines 17-17 shown in FIG. 16, showing another exemplary embodiment of a absorption element.
Figure 17C:
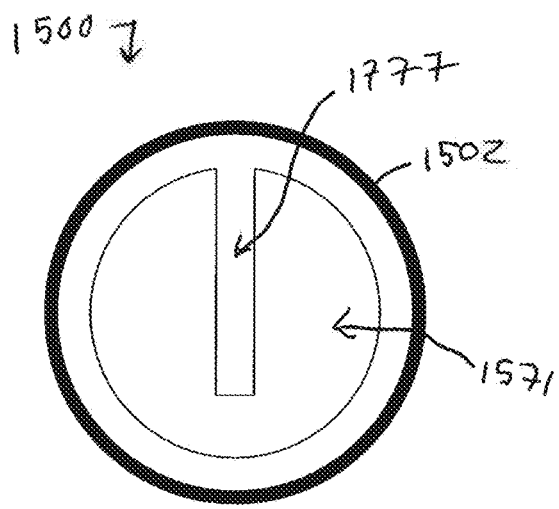
FIG. 17C is a cross-sectional view of the hinge lubrication device of FIG. 15 taken along the lines 17-17 shown in FIG. 16, showing another exemplary embodiment of a absorption element.
Figure 17D:
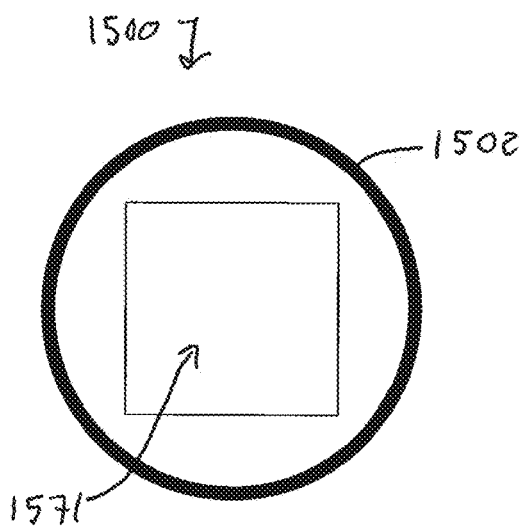
FIG. 17D is a cross-sectional view of the hinge lubrication device of FIG. 15 taken along the lines 17-17 shown in FIG. 16, showing another exemplary embodiment of a absorption element.
Figure 18:
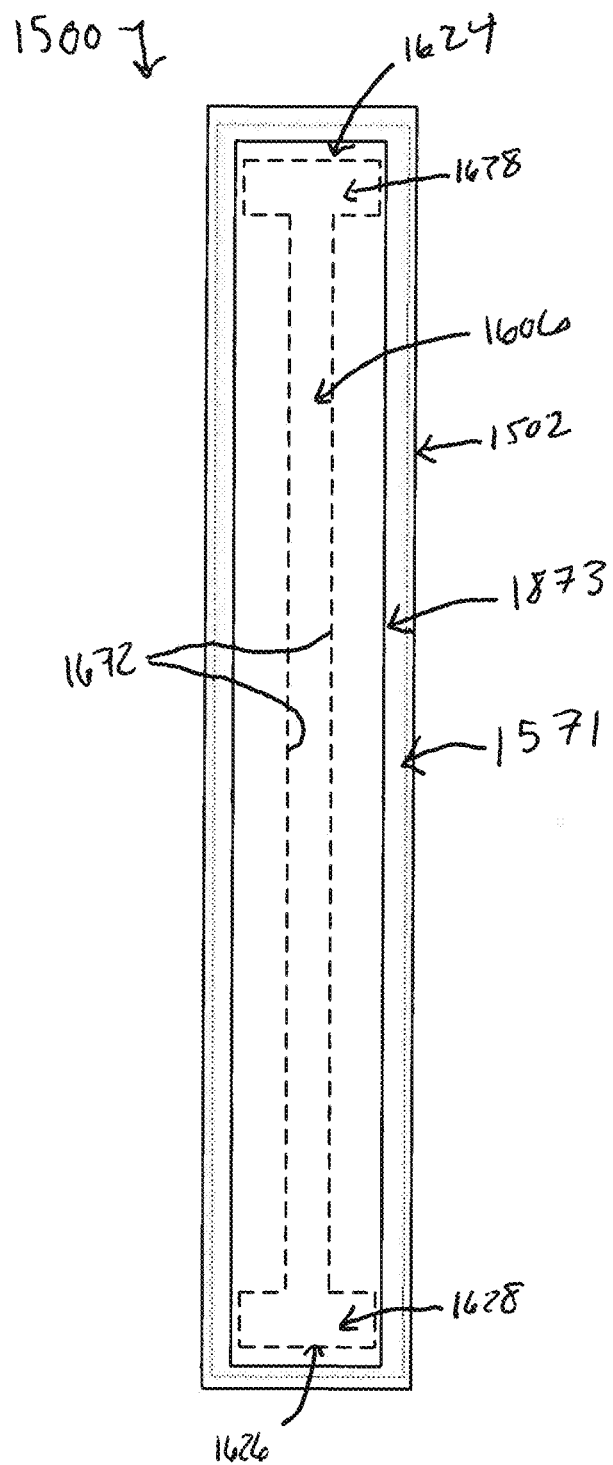
FIG. 18 is a front schematic view of the hinge lubrication device of FIG. 15, in which the hinge lubrication device has a sealing member for sealing a hinge opening of the device.

Referring to FIG. 17A, in one exemplary embodiment, the absorption element 1571 has a cylindrical form that aligns with the cylindrical shape of the housing 1502. While the illustrated embodiment shows the absorption element 1571 and the housing 1502 having a cylindrical shape, it should be understood that the housing 1502 and the absorption element 1571 may have any other suitable shape, such as, for example, a rectangular prism shape or any other suitable shape. Referring to FIG. 17B, in certain embodiments, the absorption element 1571 includes a cutout 1775 that is configured for receiving the hinge when the hinge is disposed within the housing 1502 such that the absorption element 1571 can at least partially surround the hinge. In these embodiments, the cutout 1775 is aligned with the hinge opening 1606 of the device 1500. Referring to FIG. 17C, in some embodiments, the absorption element 1571 includes a slit 1777 that is configured to receive the hinge when the hinge is disposed within the housing 1502 such that the absorption element 1571 can at least partially surround the hinge. In these embodiments, the slit 1777 is aligned with the hinge opening 1606 of the device 1500. Referring to FIG. 17D, in certain embodiments, the absorption element 1571 has a different shape than the housing 1502. For example, in the illustrated embodiment, the absorption element 1571 has a rectangular prism shape and the housing 1502 has a cylindrical shape. The embodiments shown in FIGS. 17A-17D are only exemplary, and it should be understood that the absorption element 1571 can also be any combination of these forms or take any other suitable form.

An exemplary method of lubricating a hinge includes placing the hinge lubrication device 1500 onto the hinge by aligning the hinge opening 1606 with the hinge and providing a force to the device such that the hinge enters the housing 1502 and engages the absorption element 1571. In some embodiments, the hinge opening 106 may include one or more wider openings 1628 that are configured to align with one or both of the top and bottom tips of the hinge prior to forcing the device onto the hinge. In certain embodiments, the hinge opening 1606 is smaller than the hinge 10 such that a force needs to be provided to the device 1500 to cause the material of the housing 1502 to flex and allow the hinge to move through the opening 1606. After the hinge is in the housing 1502, the flexible material of the housing 1502 moves back to its normal position such that the housing prevents the hinge from moving back through the opening 1606 without a force from a user. The sides 1672 of the opening 1606 may be configured to enclose the hinge to prevent lubricant from leaving the device 1500 during lubrication of the hinge. In certain embodiments, the sides 1672 of the opening 1606 may include flaps the at least partially cover the opening 1606 when the hinge is encapsulated within the housing 1502 to prevent lubricant from leaving the device 1500. In some embodiments, the opening 1606 is larger than the hinge, and the device 1500 remains on the hinge by a gravitational force provided on the device.

After the hinge lubrication device 1500 is placed on the hinge, the method includes providing a force to the absorption element 1571 to cause the lubricant to dispense from the absorption element 1571 and onto the hinge such that the lubricant moves between the various parts (e.g., the knuckles, the bearings, the shaft, the top tip, and the bottom tip) of the hinge. In certain embodiments, the housing 1502 is made of a flexible material such that a user can squeeze the housing to provide a force to the absorption element 1571 that causes the lubricant to be dispensed from the absorption element. The hinge lubrication device 1500 may also be partially rotated by the user such that the absorption element 1571 wipes the hinge as the lubricant is dispensed from the absorption element 1571. In some embodiments, the hinge lubrication device 1500 may include a hose or tube (e.g., tube 160 shown in FIGS. 1 and 2) that is in fluid communication with the housing 1502 such that excess lubricant can move from the housing, through the tube, and into a separate receptacle (not shown).

After the lubricant is dispensed from the absorption element 1571, the user can remove the hinge lubrication device 1500 by providing a force on the housing 1502 that causes the hinge to move back through the hinge opening 1606 such that the hinge is no longer disposed within the housing 1502. The sides 1572 of the hinge opening 1606 may be configured to wipe excess lubricant off of the hinge as they are pulled across the hinge during the removal process. That is, the sides 1572 can act as a squeegee device that wipes excess lubricant from the hinge when the device 1500 is removed from the hinge.

The hinge lubrication device 1500 may then be used to lubricate another hinge. If the absorption element 1571 is pre-lubricated, the absorption element 1571 may include a sufficient amount of lubrication that allows a user to lubricate multiple hinges with the same absorption element 1571. A user may also be able to add lubricant to the absorption element 1571 through the hinge opening 1606. In some embodiments, the housing 1502 may have an opening (not shown) covered by a removable cap (not shown) such that a user can remove the absorption element 1571 after use and replace the used absorption element 1571 with another absorption element.

Figure 19:
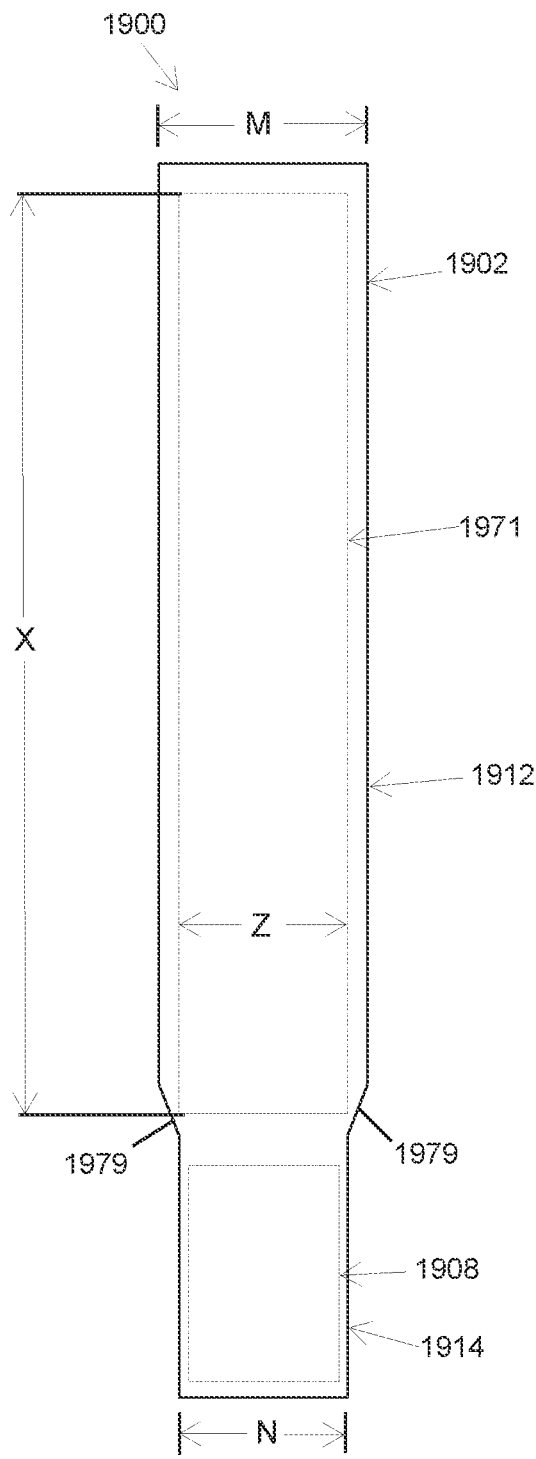
FIG. 19 is a front schematic view of another exemplary embodiment of a hinge lubrication device.
Figure 20:
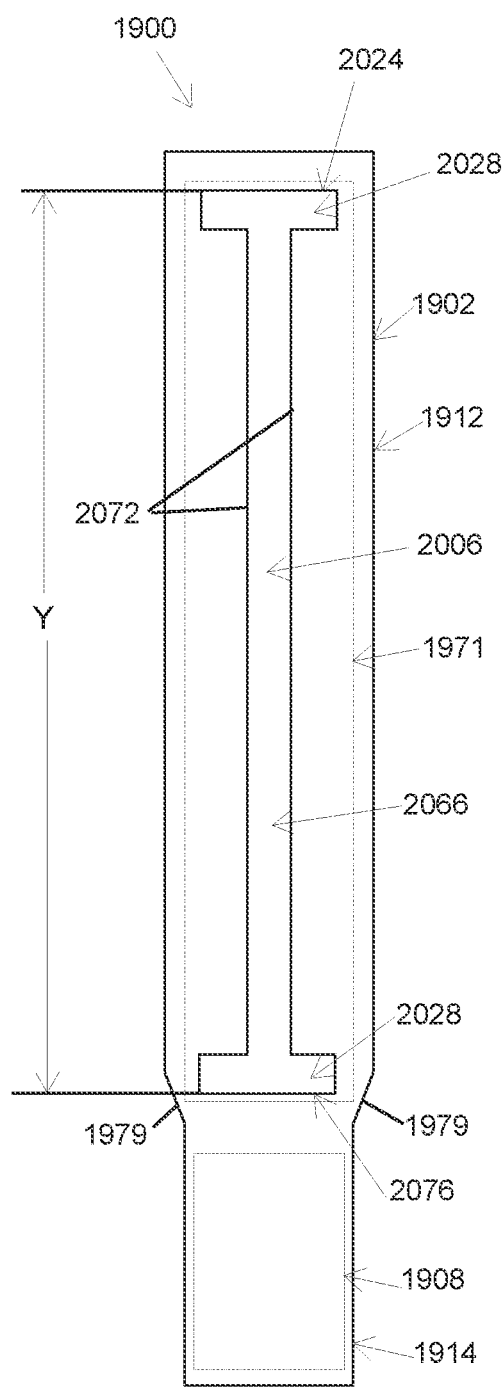
FIG. 20 is a rear schematic view of the hinge lubrication device of FIG. 19.

FIGS. 19-20 illustrate another exemplary embodiment of a hinge lubrication device 1900 that includes a housing 1902, a hinge opening 2006, a first absorption element 1971 and a second absorption element 1908. The housing 1902 includes a first portion 1912 that is sized for holding the first absorption element 1971 and a hinge (e.g., hinge 10 shown in FIGS. 2 and 4), and a second portion 1914 that is sized for holding the second absorption element 1908. The first portion 1912 is in fluid communication with the second portion 1914, and the second portion 1914 acts as a lubrication collection chamber for collecting excess lubricant that is applied to a hinge in the first portion 1912 of the housing 1902. In some embodiments, the second portion 1914 has an opening and a removable cap (e.g., opening 116 and cap 110 in FIG. 1) such that the second absorption element 1908 can be removed and replaced with another absorption element. In the illustrated embodiment, the first and second portions 1912, 1914 are a single part. In other embodiments, the first and second portions 1912, 1914 can be separate parts that are configured to attach to each other to create the housing 1902. In various embodiments, at least a portion of the housing 1902 is made of a flexible material, such as, for example, silicone, natural rubber, urethane or other plastics, or any other type of suitable flexible material.

The hinge opening 2006 is disposed on the first portion 1912 of the housing and is configured to receive a hinge (e.g., hinge 10 shown in FIGS. 3 and 4) such that the hinge is disposed within the housing 1902 of the device. In other embodiments, a portion of the hinge opening 2006 may be disposed on each of the first portion 1912 and the second portion 1914. The hinge opening 2006 may take any suitable form, such as, for example, any form of a hinge opening described in the present application. In the illustrated embodiment, the hinge opening 2006 has a top end 2024, a bottom end 2026, and sides 2072, in which the opening 2006 extends from the top end 2024 to the bottom end 2026 along a height of the housing 1902. In certain embodiments, the opening 2006 includes an elongated slot 2066 and a wider opening 2028 proximate one or both of the top end 2024 and the bottom end 2026 of the opening 2006.

In various embodiments, the housing 1902 includes one or more lips (e.g., lip 1058 shown in FIG. 10) that extend into the top end 1924 and/or the bottom end 1926 of the opening 2006 to prevent a hinge from moving out of the hinge lubrication device 1900 through the opening 2006 during use of the hinge lubrication device. The lip also helps contain any lubricant directed upwardly during use of the hinge lubrication device from exiting through the opening 2006.

In certain embodiments, the housing 1902 has a door stop opening (e.g., door stop opening 1052 shown in FIG. 10) for receiving door stops that are attached to the hinge. The housing 1902 may also one or more curtains (e.g., curtains 1054) that extend over the door stop opening. When the hinge lubrication device 1900 is attached to a hinge having a door stop, the curtain encloses a door stop within the door stop opening to prevent lubricant from moving out of the door stop opening and onto the door. The one or more curtains may be pivotally attached to the housing 1902 such that the curtains can pivot relative to the housing to allow the door stop to enter door stop opening. After the door stop enters the door stop opening, the one or more curtains pivot back toward its normal position to enclose the door stop within the door stop opening. The one or more curtains can be made of a flexible material, such as, for example, silicone, natural rubber, urethane or other plastics, etc.

The first absorption element 1971 is configured to absorb lubricant and distribute the lubricant to a hinge when an external force is applied to the first absorption element 1971. That is, lubricant can be distributed from the first absorption element 1971 to a hinge by providing a force to the absorption element 1971 that causes the lubricant to dispense from the absorption element 1971. The absorption element 1971 can take any suitable form that is capable of being housed within the housing 1902 and engaging a hinge to distribute lubricant to the hinge, such as, for example, any form described in the present application for absorption element 1571 shown in FIGS. 15-18.

In the illustrated embodiment, at least a portion of the housing 1902 is made from a flexible material (e.g., silicone, natural rubber, urethane or other plastics, or any other type of suitable flexible material) such that a user can squeeze the housing to provide the necessary force to the absorption element 1971 and dispense the lubricant on to the hinge. In certain embodiments, the first absorption element 1971 has a height X that is greater than or equal to the height Y of the opening 2006, which ensures that the entire hinge is engaged by the first absorption element 1971 when the hinge is received by the hinge opening 2006. The first absorption element 1971 can be made of any material that is capable of absorbing a lubricant and distributing the lubricant to a hinge, such as, for example, a sponge, a cloth material, or any other suitable material.

In certain embodiments, the first absorption element 1971 can be pre-lubricated such that the device 1900 is ready to be used by a user upon obtaining the device. The entire first absorption element 1971 may be pre-lubricated, or only a portion of the first absorption element may be pre-lubricated. In some embodiments, only a portion of the first absorption element 1971 that is disposed facing the portion of the housing 1902 that does not include the hinge opening 2006 is pre-lubricated. In embodiments in which the absorption element 1971 is pre-lubricated, a sealing member (e.g., sealing member 1873 shown in FIG. 18) may be used to prevent the pre-lubricated absorption element 1971 from drying due to exposure to environmental conditions outside of the housing 1902. In alternative embodiments, the absorption element 1971 is not pre-lubricated, but a user can lubricate the absorption element by providing lubricant to the absorption element 1971 through the hinge opening 2006 prior to placing the device 1900 onto a hinge.

The second absorption element 1908 is configured to collect and absorb excess lubricant that is dispensed from the first absorption element 1971 during lubrication of the hinge. In addition, in embodiments in which the a user provides lubricant to the first absorption element 1971 through the hinge opening 2006, any excess lubricant that drips off of the first absorption element 1971 can be collected and absorbed by the second absorption element 1908. The second absorption element 1908 can take any suitable form that is capable of being disposed within the second portion 1914 of the housing 1902, such as, for example, any form described in the present application for the absorption element 108 of FIGS. 1-4.

In the illustrated embodiment, the first portion 1912 of the housing 1902 has a width M and the second portion 1914 of the housing 1902 has a width N, and the first absorption element 1971 has a width Z. The width N of the second portion 1914 may be less than the both the width M of the first portion 1912 and the width Z of the first absorption element 1971. In these embodiments, the smaller width N of the second portion 1914 of the housing 1902 prevents the first absorption element 1971 from moving into the second portion 1914 and contacting the second absorption element 1908. In the illustrated embodiment, the housing 1902 includes a downward slope 1979 that facilitates movement of any excess lubricant from the first portion 1912 of the housing 1902 to the second portion 1914 of the housing 1902.

In some embodiments, the housing 1902 includes one or more channels (not shown) for facilitating movement of any excess lubricant to the second portion 1914 of the housing 1902. The channels may extend into an interior surface of the housing 1902. In some embodiments, the channels are disposed within the walls of the housing 1902. For example, the channels may be disposed between an interior surface and an exterior surface of a wall of the housing 1902, in which one or more openings in the interior surface of the housing 1902 are in fluid communication with the channels such that excess lubricant can move through the channels and into the second portion 1914 of the housing.

An exemplary method of lubricating a hinge includes placing the hinge lubrication device 1900 onto the hinge by aligning the hinge opening 2006 with the hinge and providing a force to the device such that the hinge enters the housing 1902 and engages the first absorption element 1971. After the hinge lubrication device 1900 is placed on the hinge, the method includes providing a force to the first absorption element 1971 to cause the lubricant to dispense from the first absorption element 1971 and onto the hinge such that the lubricant moves between the various parts (e.g., the knuckles, the bearings, the shaft, the top tip, and the bottom tip) of the hinge. In certain embodiments, at least a portion of the housing 1902 is made of a flexible material such that a user can squeeze the housing to provide a force to the first absorption element 1971 that causes the lubricant to be dispensed from the first absorption element. The hinge lubrication device 1900 may also be partially rotated by the user such that the first absorption element 1971 wipes the hinge as the lubricant is dispensed from the absorption element 1971.

Excess lubricant may fall off of the hinge during lubrication of the hinge and this excess lubricant may be collected and absorbed by the second absorption element 1908. In certain embodiments, the housing 1902 may have an opening (not shown) covered by a removable cap (not shown) such that a user can remove the second absorption element 1908 after use and replace the used second absorption element 1908 with another absorption element. In some embodiments, the hinge lubrication device 1900 may include a hose or tube (e.g., tube 160 shown in FIGS. 1 and 2) that is in fluid communication with the second portion 1914 of the housing 1902 such that excess lubricant can move from the housing, through the tube, and into a separate receptacle (not shown).

After the lubricant is dispensed from the first absorption element 1971, the user can remove the hinge lubrication device 1900 by providing a force on the housing 1902 that causes the hinge to move back through the hinge opening 2006 such that the hinge is no longer disposed within the housing 1902. The sides 2072 of the hinge opening 2006 may be configured to wipe excess lubricant off of the hinge as they are pulled across the hinge during the removal process. That is, the sides 2072 can act as a squeegee device that wipes excess lubricant from the hinge when the device 1900 is removed from the hinge.

The hinge lubrication device 1900 may then be used to lubricate another hinge. If the first absorption element 1971 is pre-lubricated, the first absorption element 1971 may include a sufficient amount of lubrication that allows a user to lubricate multiple hinges with the same first absorption element 1971. A user may also be able to add lubricant to the first absorption element 1971 through the hinge opening 2006. In some embodiments, the housing 1902 may have an opening (not shown) covered by a removable cap (not shown) such that a user can remove the first absorption element 1971 after use and replace the used first absorption element 1971 with another absorption element.

Figure 21:
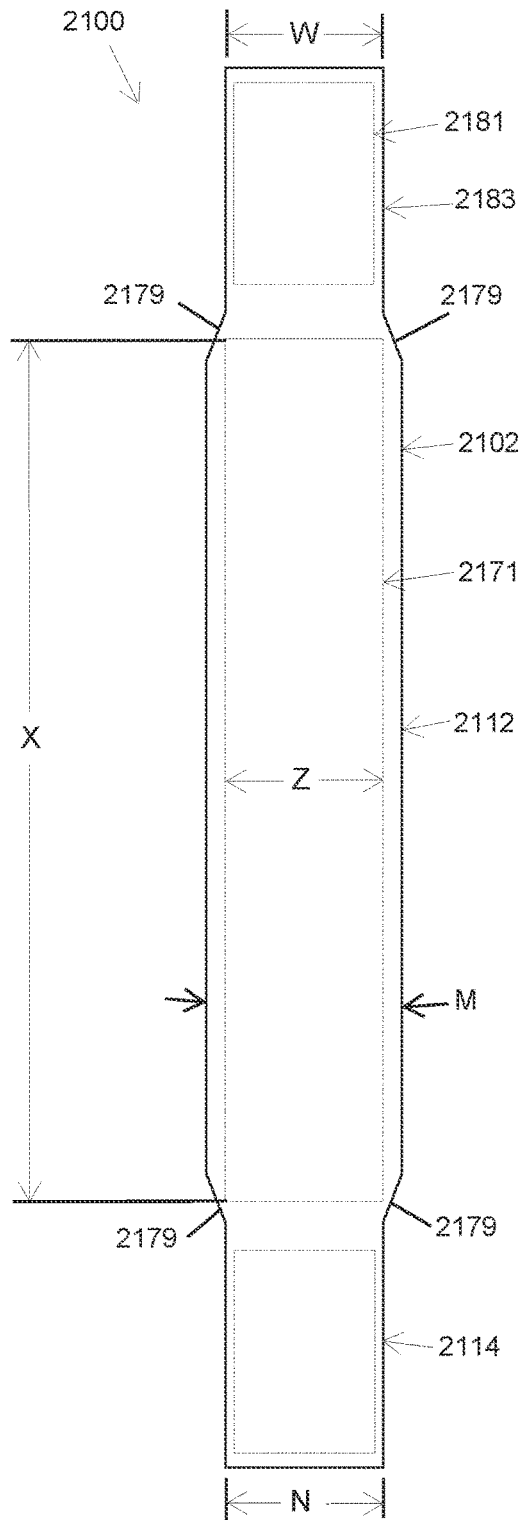
FIG. 21 is a front schematic view of another exemplary embodiment of a hinge lubrication device.
Figure 22:
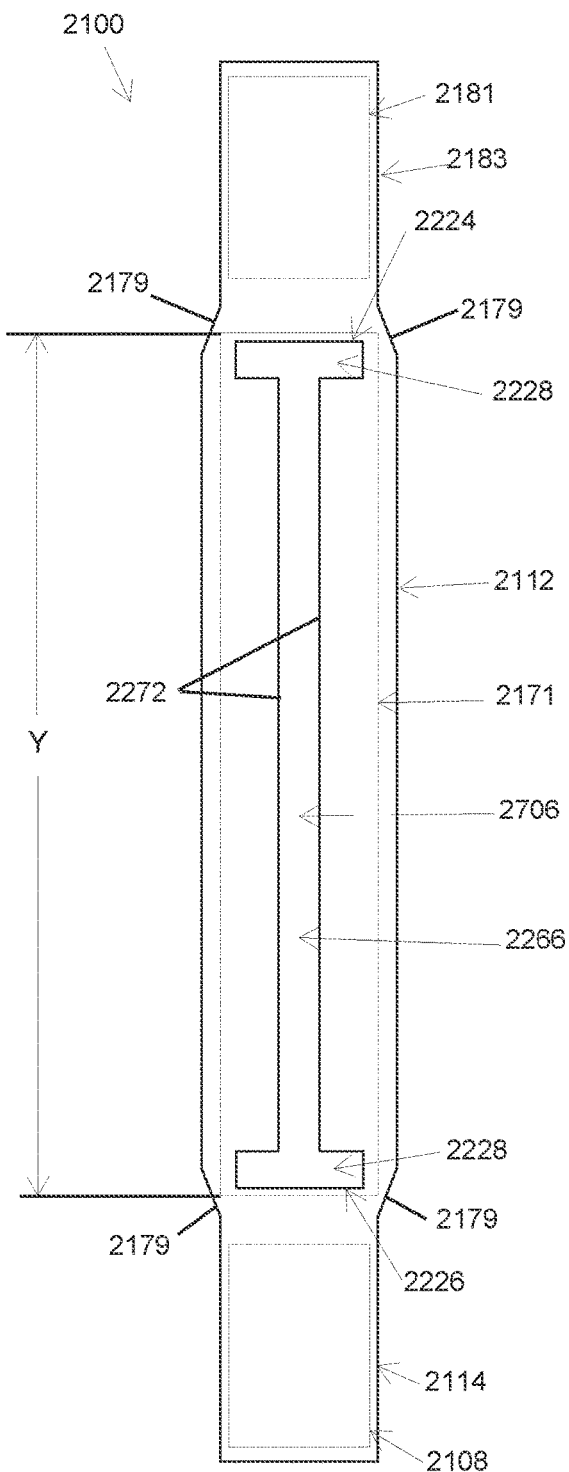
FIG. 22 is a rear schematic view of the hinge lubrication device of FIG. 21.

FIGS. 21-22 illustrate another exemplary embodiment of a hinge lubrication device 2100 that includes a housing 2102, a hinge opening 2206, a first absorption element 2171, a second absorption element 2108, and a third absorption element 2181. The housing 2102 includes a first portion 2112 that is sized for holding the first absorption element 2171 and a hinge (e.g., hinge 10 shown in FIGS. 2 and 4). The housing 2102 also has a second portion 2114 that is sized for holding the second absorption element 2108 and a third portion 2183 that is sized for holding the third absorption element 2181. The first portion 2112 is in fluid communication with the second portion 2114 and the third portion 2183. The second portion 2114 and the third portion 2183 act as a lubrication collection chambers for collecting excess lubricant that is applied to a hinge in the first portion 2112 of the housing 2102. In some embodiments, one or both of the second portion 2114 and the third portion 2183 has an opening and a removable cap (e.g., opening 116 and cap 110 in FIG. 1) such that the absorption elements 2108, 2181 can be removed and replaced with another absorption element. In the illustrated embodiment, the first, second, and third portions 2112, 2114, 2183 are a single part. In other embodiments, any of the three portions 2112, 2114, 2183 can be separate parts that are configured to attach to each other to create the housing 2102. In various embodiments, at least a portion of the housing 2102 is made of a flexible material, such as, for example, silicone, natural rubber, urethane or other plastics, or any other type of suitable flexible material.

The hinge opening 2206 is disposed on the first portion 2112 of the housing and is configured to receive a hinge (e.g., hinge 10 shown in FIGS. 3 and 4) such that the hinge is disposed within the housing 2102 of the device. In other embodiments, a portion of the hinge opening 2206 may also be extend onto one or both of the second portion 2114 and the third portion 2183. The hinge opening 2206 may take any suitable form, such as, for example, any form of a hinge opening described in the present application. In the illustrated embodiment, the hinge opening 2206 has a top end 2224, a bottom end 2226, and sides 2272, in which the opening 2206 extends from the top end 2224 to the bottom end 2226 along a height of the housing 1902. In certain embodiments, the opening 2206 includes an elongated slot 2266 and a wider opening 2228 proximate one or both of the top end 2224 and the bottom end 2226 of the opening 2006.

In various embodiments, the housing 2102 includes one or more lips (e.g., lip 1058 shown in FIG. 10) that extend into the top end 2224 and/or the bottom end 2226 of the opening 2206 to prevent a hinge from moving out of the hinge lubrication device 2100 through the opening 2206 during use of the hinge lubrication device. The lip also helps contain any lubricant directed upwardly during use of the hinge lubrication device from exiting through the opening 2206.

In certain embodiments, the housing 2102 has a door stop opening (e.g., door stop opening 1052 shown in FIG. 10) for receiving door stops that are attached to the hinge. The housing 2102 may also one or more curtains (e.g., curtains 1054) that extend over the door stop opening. When the hinge lubrication device 2100 is attached to a hinge having a door stop, the curtain encloses a door stop within the door stop opening to prevent lubricant from moving out of the door stop opening and onto the door. The one or more curtains may be pivotally attached to the housing 2102 such that the curtains can pivot relative to the housing to allow the door stop to enter door stop opening. After the door stop enters the door stop opening, the one or more curtains pivot back toward its normal position to enclose the door stop within the door stop opening. The one or more curtains can be made of a flexible material, such as, for example, silicone, natural rubber, urethane or other plastics, etc.

The first absorption element 2171 is configured to absorb lubricant and distribute the lubricant to a hinge when an external force is applied to the first absorption element 2171. That is, lubricant can be distributed from the first absorption element 2171 to a hinge by providing a force to the absorption element 2171 that causes the lubricant to dispense from the absorption element 2171. The first absorption element 2171 can take any suitable form that is capable of being housed within the housing 2102 and engaging a hinge to distribute lubricant to the hinge, such as, for example, any form described in the present application for absorption element 1571 shown in FIGS. 15-18.

In the illustrated embodiment, at least a portion of the housing 2102 is made from a flexible material (e.g., silicone, natural rubber, urethane or other plastics, or any other type of suitable flexible material) such that a user can squeeze the housing to provide the necessary force to the absorption element 2171 and dispense the lubricant on to the hinge. In certain embodiments, the first absorption element 2171 has a height X that is greater than or equal to the height Y of the opening 2206, which ensures that the entire hinge is engaged by the first absorption element 2171 when the hinge is received by the hinge opening 2206. The first absorption element 2171 can be made of any material that is capable of absorbing a lubricant and distributing the lubricant to a hinge, such as, for example, a sponge, a cloth material, or any other suitable material.

In certain embodiments, the first absorption element 2171 can be pre-lubricated such that the device 2100 is ready to be used by a user upon obtaining the device. The entire first absorption element 2171 may be pre-lubricated, or only a portion of the first absorption element may be pre-lubricated. In some embodiments, only a portion of the first absorption element 2171 that is disposed facing the portion of the housing 2102 that does not include the hinge opening 2206 is pre-lubricated. In embodiments in which the absorption element 2171 is pre-lubricated, a sealing member (e.g., sealing member 1873 shown in FIG. 18) may be used to prevent the pre-lubricated absorption element 2171 from drying due to exposure to environmental conditions outside of the housing 2102. In alternative embodiments, the absorption element 2171 is not pre-lubricated, but a user can lubricate the absorption element by providing lubricant to the absorption element 2171 through the hinge opening 2206 prior to placing the device 2100 onto a hinge.

The second absorption element 2108 and the third absorption element 2181 are configured to collect and absorb excess lubricant that is dispensed from the first absorption element 2171 during lubrication of the hinge. In addition, in embodiments in which the a user provides lubricant to the first absorption element 2171 through the hinge opening 2206, any excess lubricant that drips off of the first absorption element 2171 can be collected and absorbed by either of the second absorption element 2108 and third absorption element 2181. The second and third absorption elements 2108, 2181 can take any suitable form, such as, for example, any form described in the present application for the absorption element 108 of FIGS. 1-4.

In the illustrated embodiment, the first portion 2112 of the housing 2102 has a width M, the second portion 2114 of the housing 2102 has a width N, the third portion 2183 of the housing 2102 has a width W, and the first absorption element 2171 has a width Z. The width N of the second portion 2114 and the width W of the third portion 2183 may be less than both the width M of the first portion 2112 and the width Z of the first absorption element 2171. In these embodiments, the smaller widths N, W of the second portion 2114 and third portion 2183, respectively, prevents the first absorption element 2171 from moving into the second portion 2114 and contacting the second absorption element 2108 or into the third portion 2183 and contacting the third absorption element 2181. The width N of the second portion 2114 may be substantially equal to the width W of the third portion 2183, or these widths N, W may be different. In the illustrated embodiment, the housing 2102 includes downward slope 2179 that facilitates movement of any excess lubricant from the first portion 2112 of the housing 2102 to either the second portion 2114 or third portion 2183 of the housing 2102. The device 2100 is advantageous because either end of the device 2100 can be aligned with both the top and bottom tips of the hinge.

In some embodiments, the housing 2102 includes one or more channels (not shown) for facilitating movement of any excess lubricant to the second portion 2114 and/or third portion 2183 of the housing 2102. The channels may extend into an interior surface of the housing 2102. In some embodiments, the channels are disposed within the walls of the housing 2102. For example, the channels may be disposed between an interior surface and an exterior surface of a wall of the housing 2102, in which one or more openings in the interior surface of the housing 2102 are in fluid communication with the channels such that excess lubricant can move through the channels and into the second portion 2114 or third portion 2183 of the housing.

An exemplary method of lubricating a hinge includes placing the hinge lubrication device 2100 onto the hinge by aligning the hinge opening 2206 with the hinge and providing a force to the device such that the hinge enters the housing 2102 and engages first absorption element 2171. After the hinge lubrication device 2100 is placed on the hinge, the method includes providing a force to the first absorption element 2171 to cause the lubricant to dispense from the first absorption element 2171 and onto the hinge such that the lubricant moves between the various parts (e.g., the knuckles, the bearings, the shaft, the top tip, and the bottom tip) of the hinge. In certain embodiments, at least a portion of the housing 1102 is made of a flexible material such that a user can squeeze the housing to provide a force to the first absorption element 2171 that causes the lubricant to be dispensed from the first absorption element. The hinge lubrication device 2100 may also be partially rotated by the user such that the first absorption element 2171 wipes the hinge as the lubricant is dispensed from the absorption element 2171.

Excess lubricant may fall off of the hinge during lubrication of the hinge and this excess lubricant may be collected and absorbed by either the second absorption element 2108 or the third absorption element 2181 depending on which absorption element is below the first absorption element 2171 when the device 2100 is disposed on a hinge. In certain embodiments, the second portion 2114 and/or the third portion 2183 of the housing 2102 may have an opening (not shown) covered by a removable cap (not shown) such that a user can remove the absorption elements 2108, 2181 after use and replace the used second absorption element with another absorption element.

After the lubricant is dispensed from the first absorption element 2171, the user can remove the hinge lubrication device 2100 by providing a force on the housing 2102 that causes the hinge to move back through the hinge opening 2206 such that the hinge is no longer disposed within the housing 2102. The sides 2272 of the hinge opening 2206 may be configured to wipe excess lubricant off of the hinge as they are pulled across the hinge during the removal process. That is, the sides 2272 can act as a squeegee device that wipes excess lubricant from the hinge when the device 2100 is removed from the hinge.

The hinge lubrication device 2100 may then be used to lubricate another hinge. If the first absorption element 2171 is pre-lubricated, the first absorption element 2171 may include a sufficient amount of lubrication that allows a user to lubricate multiple hinges with the same first absorption element 2171. A user may also be able to add lubricant to the first absorption element 2171 through the hinge opening 2206. In some embodiments, the housing 1902 may have an opening (not shown) covered by a removable cap (not shown) such that a user can remove the first absorption element 2171 after use and replace the used first absorption element 2171 with another absorption element.

FIGS. 23-24 illustrate another exemplary embodiment of a hinge lubrication device 2300 that includes a housing 2302, a hinge opening 2406, an absorption element 2371, and an actuating arrangement 2385. The housing 2302 may be made from a flexible material (e.g., silicone, natural rubber, urethane or other plastics, or any other type of suitable flexible material), solid material (e.g., metals, minerals, ceramics, organic solids, composite materials, semiconductors, and biomaterials), or portions of the housing 2302 can be made from a flexible material and other portions can be made from a solid material. The hinge opening 2406 is configured to receive a hinge (e.g., hinge 10 shown in FIGS. 3 and 4) such that the hinge is disposed within the housing 2302 of the device. The hinge opening 2406 may take any suitable form, such as, for example, the hinge opening 1606 described in FIGS. 15-18, or any other form described in the present application.

In various embodiments, the housing 2302 includes one or more lips (e.g., lip 1058 shown in FIG. 10) that extend into a top end 2424 and/or bottom end 2426 of the opening 2406 to prevent a hinge from moving out of the hinge lubrication device 2300 through the opening 2406 during use of the hinge lubrication device.

In certain embodiments, the housing 2302 has a door stop opening (e.g., door stop opening 1052 shown in FIG. 10) for receiving door stops that are attached to the hinge. The housing 2302 may also one or more curtains (e.g., curtains 1054) that extend over the door stop opening. When the hinge lubrication device 2300 is attached to a hinge having a door stop, the curtain encloses a door stop within the door stop opening to prevent lubricant from moving out of the door stop opening and onto the door. The one or more curtains may be pivotally attached to the housing 2302 such that the curtains can pivot relative to the housing to allow the door stop to enter door stop opening. After the door stop enters the door stop opening, the one or more curtains pivot back toward its normal position to enclose the door stop within the door stop opening. The one or more curtains can be made of a flexible material, such as, for example, silicone, natural rubber, urethane or other plastics, etc.

The absorption element 2371 is configured to absorb lubricant and distribute the lubricant to a hinge when an external force is applied to the absorption element 2371. That is, lubricant can be distributed from the absorption element 2371 to a hinge by providing a force to the absorption element 2371 that causes the lubricant to dispense from the absorption element 2371. The absorption element can take any suitable form, such as, for example, the form of absorption element 1571 shown in FIGS. 15-18, or any other form described in the present application. In certain embodiments, the absorption element 2371 can be pre-lubricated such that the device 2300 is ready to be used by a user upon obtaining the device. The entire absorption element 2371 may be pre-lubricated, or only a portion of the absorption element may be pre-lubricated. In embodiments in which the absorption element 2371 is pre-lubricated, a sealing member (e.g., sealing member 1873 shown in FIG. 18) may be used to prevent the pre-lubricated absorption element 2371 from drying due to exposure to environmental conditions outside of the housing 2302.

The actuating arrangement 2385 is configured to engage and provide a force to the absorption element 2371 to cause the lubricant to be dispensed from the absorption element. The actuating arrangement 2385 can include one or more actuators 2387 (e.g., buttons, knobs, switch, levers, etc.) and one or more engagement members 2389 (e.g., plungers, arms, etc.), in which the engagement members 2389 are mechanically or electrically attached to the actuators such that engagement of the actuator 2387 causes the engagement members 2389 to squeeze or otherwise engage the absorption element 2371 to cause lubricant to be dispensed from the absorption element. In the illustrated embodiment, the engagement arrangement 2385 includes two actuators 2387 and four engagement members 2385. The engagement arrangement 2385 may, however, include, any suitable number of actuators 2387 and engagement members 2389. For example, the engagement arrangement 2385 may include one or more actuators, two or more actuators, three or more actuators, etc. The engagement arrangement 2385 may also include one or more engagement members, two or more engagement members, three or more engagement members, four or more engagement members, etc. While the actuators 2387 and engagement members 2389 are shown as being on the ends of the housing 2302, it should be understood that the actuators 2387 and engagement members 2389 can be disposed on any portion of the housing 2302.

An exemplary method of lubricating a hinge includes placing the hinge lubrication device 2300 onto the hinge by aligning the hinge opening 2406 with the hinge and providing a force to the device such that the hinge enters the housing 2302 and engages the absorption element 2371. After the hinge lubrication device 2300 is placed on the hinge, the method includes providing a force to the absorption element 2371 to cause the lubricant to dispense from the absorption element 2371 and onto the hinge such that the lubricant moves between the various parts (e.g., the knuckles, the bearings, the shaft, the top tip, and the bottom tip) of the hinge. The actuating arrangement 2385 is configured to provide the requisite force to the absorption element 2371. In certain embodiments, at least a portion of the housing 1502 is made of a flexible material such that a user can also squeeze the housing to provide the required force to the absorption element 2371. The hinge lubrication device 2300 may also be partially rotated by the user such that the absorption element 2371 wipes the hinge as the lubricant is dispensed from the absorption element 2371. In some embodiments, the hinge lubrication device 2300 may include a hose or tube (e.g., tube 160 shown in FIGS. 1 and 2) that is in fluid communication with the housing 2302 such that excess lubricant can move from the housing, through the tube, and into a separate receptacle (not shown).

After the lubricant is dispensed from the absorption element 2371, the user can remove the hinge lubrication device 2300 by providing a force on the housing 2302 that causes the hinge to move back through the hinge opening 2406 such that the hinge is no longer disposed within the housing 2302. The sides 2472 of the hinge opening 2406 may be configured to wipe excess lubricant off of the hinge as they are pulled across the hinge during the removal process. That is, the sides 2472 can act as a squeegee device that wipes excess lubricant from the hinge when the device 2300 is removed from the hinge.

The hinge lubrication device 2300 may then be used to lubricate another hinge. If the absorption element 2371 is pre-lubricated, the absorption element 2371 may include a sufficient amount of lubrication that allows a user to lubricate multiple hinges with the same absorption element 2371. A user may also be able to add lubricant to the absorption element 2371 through the hinge opening 2406. In some embodiments, the housing 2302 may have an opening (not shown) covered by a removable cap (not shown) such that a user can remove the absorption element 2371 after use and replace the used absorption element 2371 with another absorption element.

Figure 25:
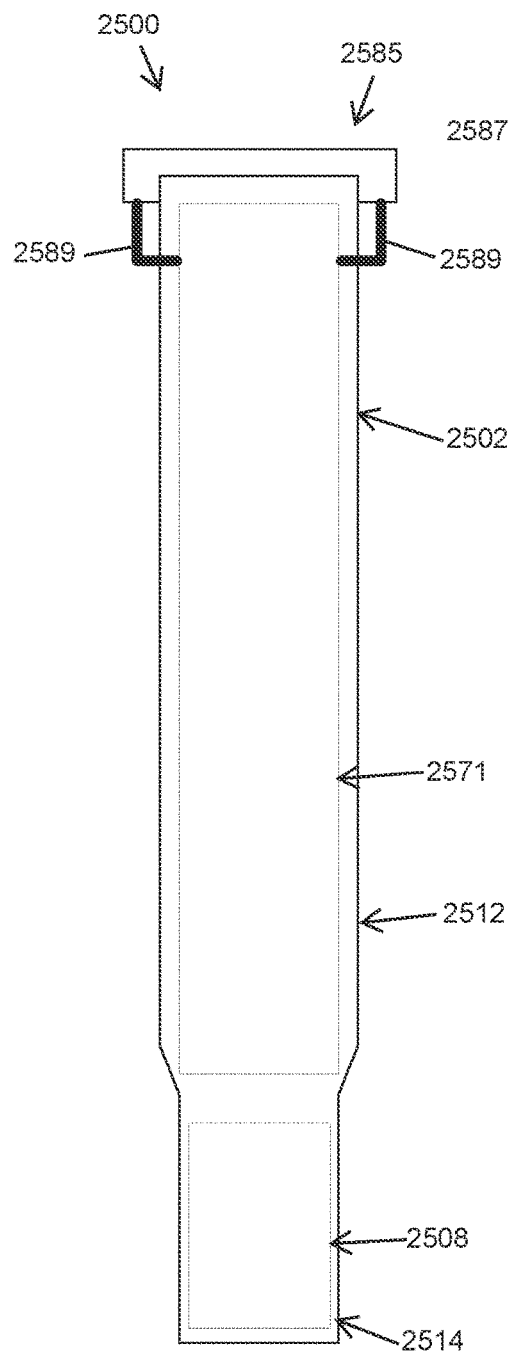
FIG. 25 is a front schematic view of another exemplary embodiment of a hinge lubrication device.
Figure 26:
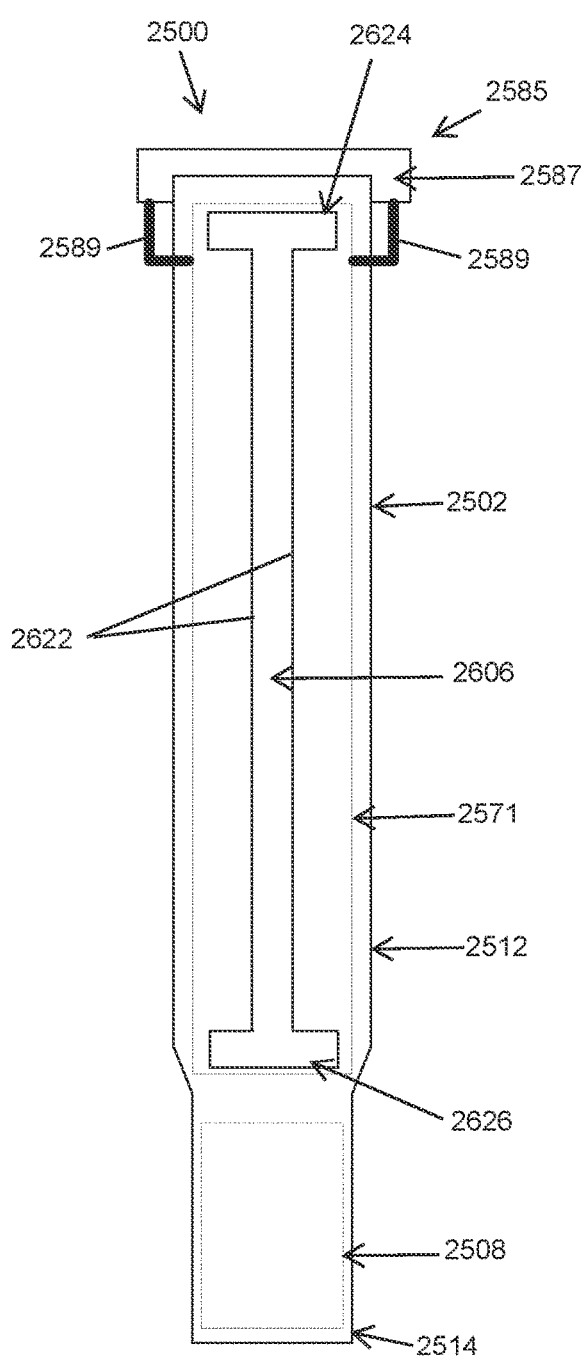
FIG. 26 is a rear schematic view of the hinge lubrication device of FIG. 25.

FIGS. 25-26 illustrate another exemplary embodiment of a hinge lubrication device 2500 that includes a housing 2502, a hinge opening 2506, a first absorption element 2571, a second absorption element 2508, and an actuating arrangement 2585. The housing 2502 may be made from a flexible material (e.g., silicone, natural rubber, urethane or other plastics, or any other type of suitable flexible material), solid material (e.g., metals, minerals, ceramics, organic solids, composite materials, semiconductors, and biomaterials), or portions of the housing 2502 can be made from a flexible material and other portions can be made from a solid material. The hinge opening 2606 is configured to receive a hinge (e.g., hinge 10 shown in FIGS. 3 and 4) such that the hinge is disposed within the housing 2302 of the device. The hinge opening 2606 may take any suitable form, such as, for example, the hinge opening 1606 described in FIGS. 15-18, or any other form described in the present application.

In various embodiments, the housing 2502 includes one or more lips (e.g., lip 1058 shown in FIG. 10) that extend into a top end 2624 and/or bottom end 2626 of the opening 2606 to prevent a hinge from moving out of the hinge lubrication device 2500 through the opening 2606 during use of the hinge lubrication device.

In certain embodiments, the housing 2502 has a door stop opening (e.g., door stop opening 1052 shown in FIG. 10) for receiving door stops that are attached to the hinge. The housing 2502 may also one or more curtains (e.g., curtains 1054) that extend over the door stop opening. When the hinge lubrication device 2500 is attached to a hinge having a door stop, the curtain encloses a door stop within the door stop opening to prevent lubricant from moving out of the door stop opening and onto the door. The one or more curtains may be pivotally attached to the housing 2502 such that the curtains can pivot relative to the housing to allow the door stop to enter door stop opening. After the door stop enters the door stop opening, the one or more curtains pivot back toward its normal position to enclose the door stop within the door stop opening. The one or more curtains can be made of a flexible material, such as, for example, silicone, natural rubber, urethane or other plastics, etc.

The absorption element 2571 is configured to absorb lubricant and distribute the lubricant to a hinge when an external force is applied to the absorption element 2571. That is, lubricant can be distributed from the absorption element 2571 to a hinge by providing a force to the absorption element 2571 that causes the lubricant to dispense from the absorption element 2571. The absorption element 2571 can take any suitable form, such as, for example, the form of absorption element 2571 shown in FIGS. 15-18, or any other form described in the present application. In certain embodiments, the absorption element 2571 can be pre-lubricated such that the device 2500 is ready to be used by a user upon obtaining the device. The entire absorption element 2571 may be pre-lubricated, or only a portion of the absorption element may be pre-lubricated. In embodiments in which the absorption element 2571 is pre-lubricated, a sealing member (e.g., sealing member 1873 shown in FIG.

18) may be used to prevent the pre-lubricated absorption element 2571 from drying due to exposure to environmental conditions outside of the housing 2502.

The actuating arrangement 2585 is configured to engage and provide a force to the first absorption element 2571 to cause the lubricant to be dispensed from the absorption element. The actuating arrangement 2585 can include one or more actuators 2587 (e.g., buttons, knobs, switch, levers, etc.) and one or more engagement members 2589 (e.g., plungers, arms, etc.), in which the engagement members 2589 are mechanically or electrically attached to the actuators such that engagement of the actuator 2587 causes the engagement members 2589 to squeeze or otherwise engage the first absorption element 2571 to cause lubricant to be dispensed from the absorption element. In the illustrated embodiment, the engagement arrangement 2585 includes one actuator 2587 and two engagement members 2585. The engagement arrangement 2585 may, however, include, any suitable number of actuators 2587 and engagement members 2589. For example, the engagement arrangement 2585 may include one or more actuators, two or more actuators, three or more actuators, etc. The engagement arrangement 2585 may also include one or more engagement members, two or more engagement members, three or more engagement members, four or more engagement members, etc. While the actuator 2587 and engagement members 2589 are shown as being on the top end of the housing 2502, it should be understood that actuators 2587 and engagement members 2589 can be disposed on any portion of the housing 2502.

The second absorption element 2508 is configured to collect and absorb excess lubricant that is dispensed from the first absorption element 2571 during lubrication of the hinge. In addition, in embodiments in which the a user provides lubricant to the first absorption element 2571 through the hinge opening 2606, any excess lubricant that drips off of the first absorption element 2571 can be collected and absorbed by the second absorption element 2508. The second absorption element 2508 can take any suitable form, such as, for example, any form described in the present application for the absorption element 108 of FIGS. 1-4.

In the illustrated embodiment, the housing includes a first portion 2512 and a second portion 2514, in which the first absorption element 2571 is disposed in the first portion 2512 and the second absorption element 2508 is disposed in the second portion. The first and second portions 2512, 2514 may take any suitable form, such as, for example, the form of housing 1900 shown in FIGS. 19-20, or any other form described in the present application. In alternative embodiments, the housing 2502 may take the form of housing 2102 in FIGS. 21-22 by having a third portion (e.g., similar to third portion 2183 in FIGS. 21-22), and the device 2500 may also include a third absorption element (e.g., similar to third absorption element 2181 in FIGS. 21-22).

In some embodiments, the housing 2502 includes one or more channels (not shown) for facilitating movement of any excess lubricant to the second portion 2514 of the housing 2502. The channels may extend into an interior surface of the housing 2502. In some embodiments, the channels are disposed within the walls of the housing 1902. For example, the channels may be disposed between an interior surface and an exterior surface of a wall of the housing 2502, in which one or more openings in the interior surface of the housing 2502 are in fluid communication with the channels such that excess lubricant can move through the channels and into the second portion 2514 of the housing.

An exemplary method of lubricating a hinge includes placing the hinge lubrication device 2500 onto the hinge by aligning the hinge opening 2606 with the hinge and providing a force to the device such that the hinge enters the housing 2502 and engages the absorption element 2571. After the hinge lubrication device 2500 is placed on the hinge, the method includes providing a force to the absorption element 2571 to cause the lubricant to dispense from the absorption element 2571 and onto the hinge such that the lubricant moves between the various parts (e.g., the knuckles, the bearings, the shaft, the top tip, and the bottom tip) of the hinge. The actuating arrangement 2585 is configured to provide the requisite force to the absorption element 2571. In certain embodiments, at least a portion of the housing 1502 is made of a flexible material such that a user can also squeeze the housing to provide the required force to the absorption element 2571. The hinge lubrication device 2500 may also be partially rotated by the user such that the absorption element 2571 wipes the hinge as the lubricant is dispensed from the absorption element 2571.

Excess lubricant may fall off of the hinge during lubrication of the hinge and this excess lubricant may be collected and absorbed by the second absorption element 2508. In certain embodiments, the housing 2502 may have an opening (not shown) covered by a removable cap (not shown) such that a user can remove the second absorption element 2508 after use and replace the used second absorption element 2508 with another absorption element. In some embodiments, the hinge lubrication device 2500 may include a hose or tube (e.g., tube 160 shown in FIGS. 1 and 2) that is in fluid communication with the second portion 2514 of the housing 2502 such that excess lubricant can move from the housing, through the tube, and into a separate receptacle (not shown).

After the lubricant is dispensed from the absorption element 2571, the user can remove the hinge lubrication device 2500 by providing a force on the housing 2502 that causes the hinge to move back through the hinge opening 2606 such that the hinge is no longer disposed within the housing 2502. The sides 2672 of the hinge opening 2606 may be configured to wipe excess lubricant off of the hinge as they are pulled across the hinge during the removal process. That is, the sides 2672 can act as a squeegee device that wipes excess lubricant from the hinge when the device 2500 is removed from the hinge.

The hinge lubrication device 2500 may then be used to lubricate another hinge. If the absorption element 2571 is pre-lubricated, the absorption element 2571 may include a sufficient amount of lubrication that allows a user to lubricate multiple hinges with the same absorption element 2571. A user may also be able to add lubricant to the absorption element 2571 through the hinge opening 2606. In some embodiments, the housing 2502 may have an opening (not shown) covered by a removable cap (not shown) such that a user can remove the absorption element 2571 after use and replace the used absorption element 2571 with another absorption element.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A device for lubricating a hinge, the device comprising:
    a flexible housing comprising a top, a bottom, an elongated body and hinge opening, wherein the hinge opening is located in the elongated body and is configured to receive a hinge such that the hinge is disposed within the housing;
    a first absorption element
    wherein the first absorption element extends along the elongated body of the flexible housing such that the first absorption element contacts more than half of the length of the hinge and such that a compression force to the flexible housing causes the first absorption element to compress;
    wherein, the first absorption element is configured to absorb a lubricant and when the hinge is disposed within the flexible housing, the first absorption element is positioned to engage more than one half of the length of the hinge such that the lubricant is dispensed from the first absorption element and onto the hinge when the first absorption element is compressed.

2. The device according to claim 1, wherein the flexible housing comprises a first portion and a second portion, wherein the first portion comprises the hinge opening, wherein the first absorption element is disposed within the first portion, and wherein the second portion comprises a collection reservoir for collecting excess lubricant that is dispensed onto the hinge.

3. The device according to claim 2, further comprising a second absorption element disposed in the second portion of the housing.

4. The device according to claim 1, wherein the first absorption element comprises a sponge.

5. The device according to claim 1, wherein at least a portion of the flexible housing comprises at least one of silicone, natural rubber, and urethane.

6. The device according to claim 1, further comprising an actuation arrangement for providing the compression force to the first absorption element.

7. The device according to claim 1, further comprising a removable cap that is movable between an open position and a closed position relative to the flexible housing such that the first absorption element can be removed from the flexible housing when the removable cap is in the open position.

8. The device according to claim 1, further comprising a tube that is in fluid communication with the flexible housing, wherein the tube is positioned such that excess lubricant moves from the flexible housing and into the tube.

9. The device according to claim 1, wherein one or more sides of the hinge opening are configured to enclose the hinge to prevent lubricant from leaving the device through the hinge opening during lubrication of the hinge.

10. The device according to claim 1, wherein one or more sides of the hinge opening are configured to wipe excess lubricant off of the hinge as the one or more sides move across the hinge during removal of the device from the hinge.

11. The device according to claim 1, wherein the first absorption element is pre-lubricated with lubricant.

12. A hinge lubricating device comprising:
    a housing;
    the housing having a top, a bottom, and an elongated body;
    a first elongated opening for allowing the elongated body to be placed over at least a portion of a hinge;
    a first absorption element entirely disposed within the elongated body such that the first absorption element is positioned to engage at least one half of the length of the hinge when the housing is placed over the portion of the hinge.

13. The hinge lubricating device according to claim 12, wherein the housing comprises a first portion and a second portion, wherein the first portion comprises the first elongated opening, wherein the first absorption element is entirely disposed within the first portion, and wherein the second portion comprises a collection reservoir for collecting excess lubricant that is dispensed onto the hinge.

14. The hinge lubricating device according to claim 13, further comprising a second absorption element disposed in the second portion of the housing.

15. The hinge lubricating device according to claim 12, wherein the first absorption element comprises a sponge.

* * * * *